United States Patent
Simon et al.

(10) Patent No.: US 11,506,316 B2
(45) Date of Patent: Nov. 22, 2022

(54) RELEASABLE CONNECT/DISCONNECT FITTING CONNECTION

(71) Applicant: IPEX TECHNOLOGIES INC., Oakville (CA)

(72) Inventors: Jis Simon, Brampton (CA); Filippo Martino, Oakville (CA)

(73) Assignee: IPEX TECHNOLOGIES INC., Mississauga (CA)

( * ) Notice: Subject to any disclaimer, the term of this patent is extended or adjusted under 35 U.S.C. 154(b) by 0 days.

(21) Appl. No.: 17/220,302

(22) Filed: Apr. 1, 2021

(65) Prior Publication Data
US 2021/0239249 A1    Aug. 5, 2021

Related U.S. Application Data

(63) Continuation-in-part of application No. 17/074,967, filed on Oct. 20, 2020, which is a continuation of
(Continued)

(30) Foreign Application Priority Data
Mar. 6, 2017   (CA) ................................ CA 2960023

(51) Int. Cl.
*F16L 37/091*    (2006.01)
*F16L 37/084*    (2006.01)
(Continued)

(52) U.S. Cl.
CPC ....... *F16L 37/0915* (2016.05); *F16L 37/0845* (2013.01); *F16L 37/0982* (2013.01); *F16L 37/0985* (2013.01); *F16L 21/08* (2013.01)

(58) Field of Classification Search
CPC . F16L 37/091; F16L 37/0982; F16L 37/0985; F16L 37/0987; F16L 37/092
See application file for complete search history.

(56) References Cited

U.S. PATENT DOCUMENTS

D140,617 S      3/1945  Rocic
3,447,819 A *   6/1969  Borsum .............. F16L 37/0982
                                                          277/609
(Continued)

FOREIGN PATENT DOCUMENTS

EP    0 397 942 A1   11/1990
GB    2 245 671 A    1/1992

OTHER PUBLICATIONS

First Examination Report issued from Indian Patent Office with respect to corresponding Indian Application 2018/14008062 dated Jun. 21, 2021.
(Continued)

*Primary Examiner* — David Bochna

(57) ABSTRACT

A connection to releasably connect and disconnect to a pipe to a fitting provides a pipe fitting body for receiving a pipe and a retaining ring assembly located within the fitting body for retaining and releasing the pipe. The retaining ring assembly has axially extending inwardly angled resilient retaining tabs, each of which has a pipe retaining portion. When the pipe is inserted into the fitting body to an inserted position, the pipe retaining portions engage an indentation on the pipe to retain the pipe in the inserted position. Relative movement of the axially extending inwardly angled resilient retaining tabs with respect to the fitting body from the first locked position to a second unlocked position causes each axially extending inwardly angled resilient retaining tabs to disengage from the indentation on the pipe permitting removal of the pipe from the inserted position in the fitting body.

21 Claims, 30 Drawing Sheets

Related U.S. Application Data application No. 15/892,652, filed on Feb. 9, 2018, now Pat. No. 10,844,988.

(51) Int. Cl.
*F16L 37/098* (2006.01)
*F16L 21/08* (2006.01)

(56) References Cited

U.S. PATENT DOCUMENTS

| | | | |
|---|---|---|---|
| 4,111,464 A | 9/1978 | Asano et al. | |
| 4,172,607 A | 10/1979 | Norton | |
| 4,804,209 A | 2/1989 | Fischer | |
| 4,927,185 A | 5/1990 | McNaughton | |
| 5,039,137 A | 8/1991 | Cankovic | |
| 5,056,833 A | 10/1991 | Webb | |
| D332,482 S | 1/1993 | Petty | |
| 5,193,859 A | 3/1993 | McKinnon | |
| 5,203,594 A | 4/1993 | Straub | |
| 5,356,183 A | 10/1994 | Cole | |
| 5,403,043 A | 4/1995 | Smet | |
| 5,430,252 A | 7/1995 | Petersen | |
| 5,813,705 A | 9/1998 | Dole | |
| 5,901,739 A | 5/1999 | Helmsderfer | |
| D414,405 S | 9/1999 | Tompkins | |
| 6,199,920 B1 | 3/2001 | Neustadtl | |
| 6,471,253 B2 | 10/2002 | Schilt | |
| 6,663,145 B1 | 12/2003 | Lyall, III | |
| D653,310 S | 1/2012 | Texier | |
| D664,839 S | 8/2012 | Bonhag | |
| 8,256,800 B2 | 9/2012 | Ward | |
| 8,322,755 B2 | 12/2012 | Kluss | |
| 8,448,995 B2 | 5/2013 | Ward | |
| 8,696,037 B2 | 4/2014 | Nakamura | |
| 9,777,875 B2 | 10/2017 | Bobo | |
| 10,844,988 B2 * | 11/2020 | Simon | F16L 37/0985 |
| 2003/0155766 A1 * | 8/2003 | Wolf | F16L 37/0987 |
| | | | 285/308 |
| 2005/0285394 A1 | 12/2005 | Muto | |
| 2007/0257488 A1 | 11/2007 | Jimenex | |
| 2007/0284037 A1 | 12/2007 | Buytaert | |
| 2009/0261585 A1 | 10/2009 | Ward | |
| 2010/0194098 A1 * | 8/2010 | Hennemann | F16L 37/0987 |
| | | | 285/81 |
| 2011/0012339 A1 * | 1/2011 | Hennemann | F16L 37/091 |
| | | | 285/39 |
| 2013/0240048 A1 | 9/2013 | Dankbaar et al. | |
| 2014/0197632 A1 * | 7/2014 | Hennemann | F16L 37/091 |
| | | | 285/319 |

OTHER PUBLICATIONS

IPEX 189680 PVC Gray Male Threaded Connector; Monarch Website Cogyright 2019; Visited Online Sep. 3, 2019; https://www.monarchelectric.com/ipex-189680-pvc-gray-male-threaded-connector-with-locknuts-1-1-4-inch-kwikon-reg-7013 (Year: 2019).

Australian Examination Report No. 1 for standard patent applicaiton 2018201442 dated Dec. 18, 2018.

IPEX-Kwikon 189671 KC30 Non-Metallic ENT Snap-On Coupling Fitting; Amazon First Available Date Jan. 2, 2014; Visited Online Apr. 13, 2020; https://www.amazon.com/Ipex-Kwikon-Non-Metallic-Coupling-Fitting-30-Pac/dp/B07M964TFJ (Year: 2014).

* cited by examiner

FIGURE 8
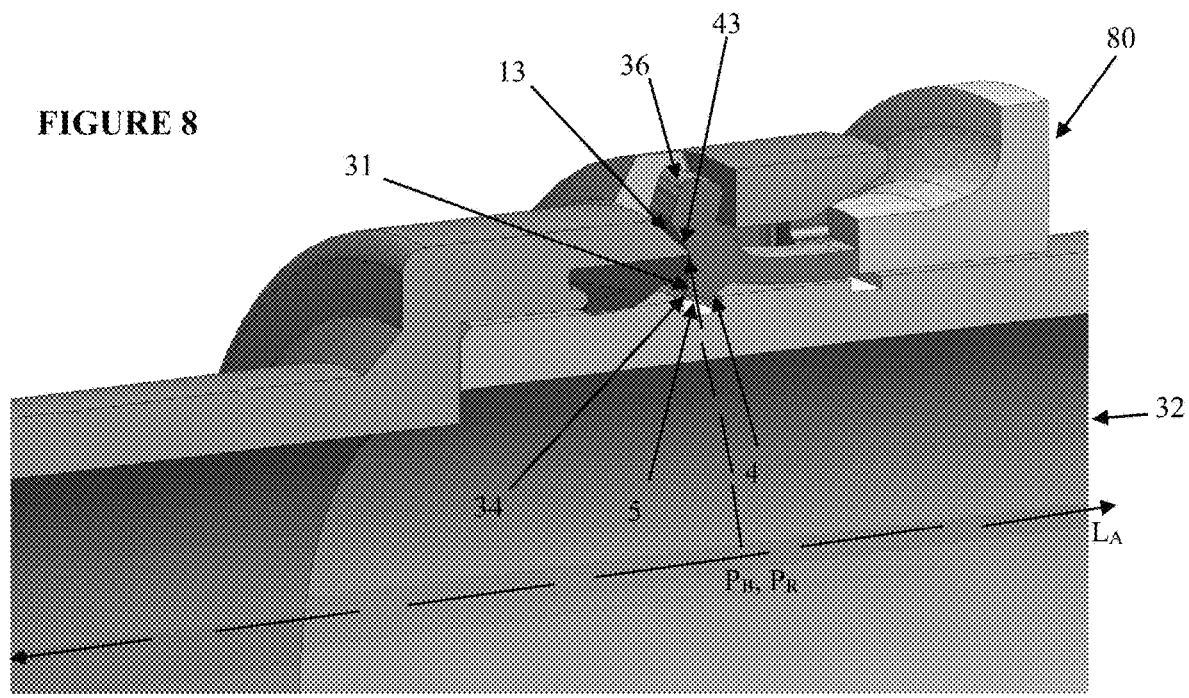
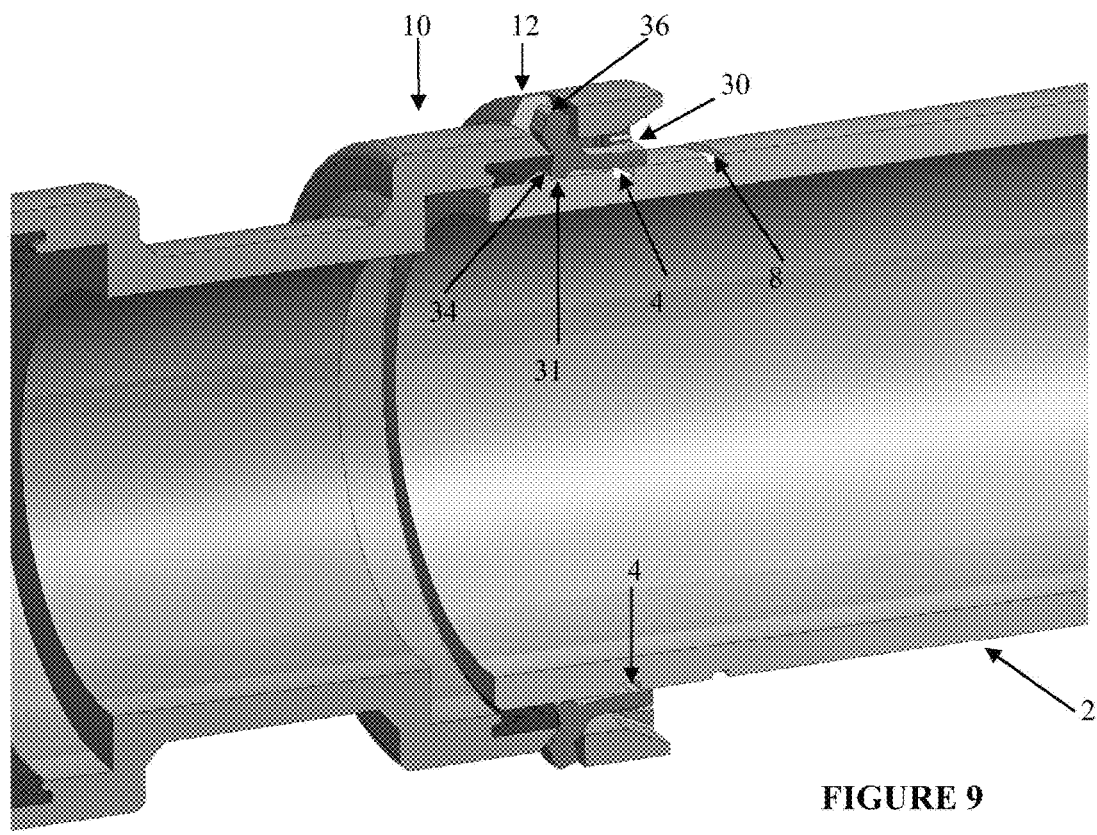
FIGURE 9

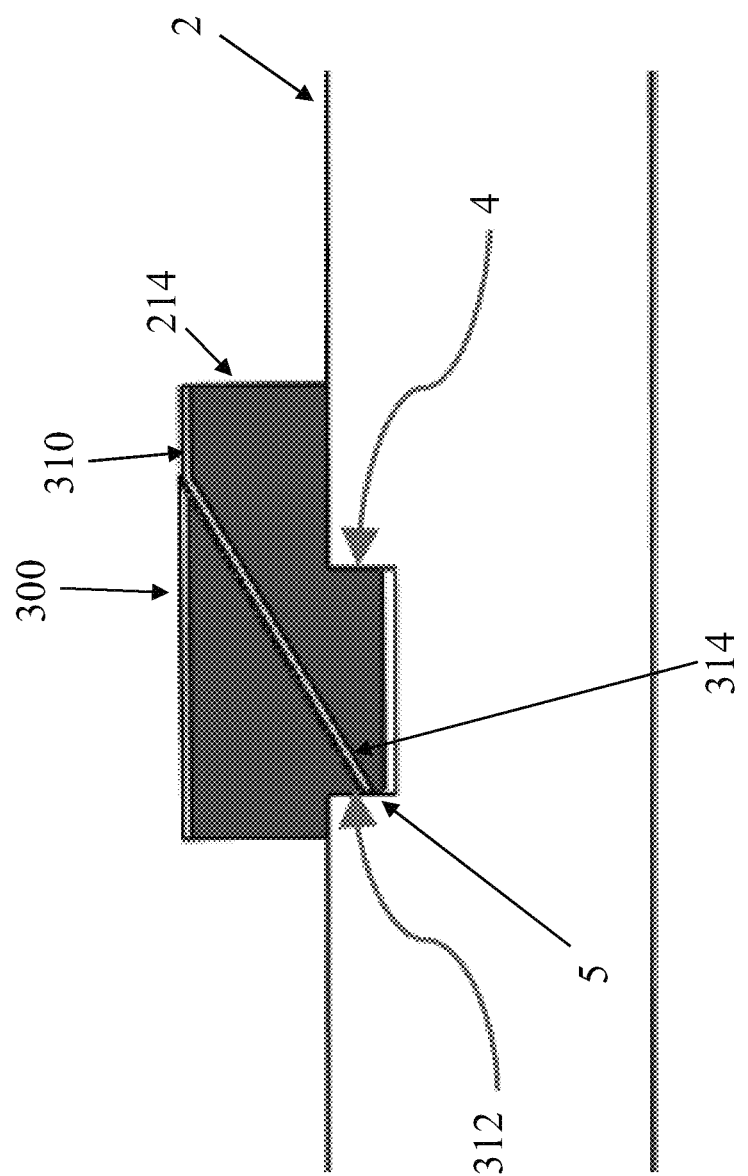

RELEASABLE CONNECT/DISCONNECT FITTING CONNECTION

RELATED APPLICATIONS

This application is a continuation-in-part of, and claims the benefit to, U.S. patent application Ser. No. 17/074,967 entitled "Releasable Connect/Disconnect fitting Connection" filed on Oct. 20, 2020 which is a continuation application of U.S. patent application Ser. No. 15/892,652 entitled "Releasable Connect/Disconnect fitting Connection" filed on Feb. 9, 2018 and now issued to U.S. Pat. No. 10,844,988 B2 all of which are hereby incorporated by reference in their entirety.

FIELD OF THE INVENTION

The invention relates to a releasable connect/disconnect fitting connection. The fitting connection could be integrally formed with a fitting, such as a pipe connector, a tee fitting, or an elbow fitting. The releasable connect/disconnect fitting permits relatively quick connection and disconnection of a pipe to a fitting by a mechanical type connection.

BACKGROUND OF THE INVENTION

In the past, there have been many different types of fitting connections to provide a connection between a pipe and a fitting through a mechanical type connection. However, the prior art connections suffer from the disadvantage that the connection is generally permanent, meaning that the fitting or connection must be destroyed or disassembled to remove the pipe. Also, the prior art connections generally do not permit relative rotation of the pipe and fitting after installation, as in many prior art connections are a solvent welded joint which generally use volatile organic solvent cements. In other words, there is no relatively efficient and/or quick manner to disconnect a pipe from a fitting once it has been connected and then reconnect another pipe or the same pipe to the fitting.

SUMMARY OF THE INVENTION

Accordingly, it is an object of this invention to at least partially overcome some of the disadvantages of the prior art. Also, it is an object of this invention to provide an improved type of connection which provides more efficient connection and disconnection of a pipe to a fitting.

Accordingly, in one aspect of the present invention, there is provided a connection to connect and disconnect a pipe to a fitting, the connection comprising: a fitting body having a pipe opening for axially receiving a pipe along a longitudinal axis and having at least one body radial opening, each body radial opening having an angled tab engaging surface; a retaining ring having at least one axially extending resilient retaining tab, each resilient retaining tab having a radially inwardly extending portion and a radially outwardly extending portion; wherein each of said radially outwardly extending portions have a chamfered body engaging surface which operatively engages the angled tab engaging surface of a corresponding body radial opening; wherein said radially inwardly extending portions engage the pipe when the pipe is in an inserted position and the retaining ring is in a first locked axial position to retain the pipe in the inserted positon; wherein relative axial movement of the retaining ring with respect to the fitting body from the first locked axial position to a second unlocked axial position causes the chamfered body engaging surface of each radially outwardly extending portion to operatively engage the angled tab engaging surface of the corresponding body radial opening to resiliently radially outwardly deform each resilient retaining tab disengaging the radially inwardly extending portions from the pipe to permit removal of the pipe from the inserted position in the fitting body.

In a preferred aspect, the present invention provides a connection to connect and disconnect a pipe to a fitting, the connection comprising: a fitting body having a pipe opening for axially receiving a pipe along a longitudinal axis; a retaining ring assembly having a plurality of axially extending inwardly angled resilient retaining tabs, each axially extending inwardly angled resilient retaining tab having a pipe retaining portion; wherein said pipe retaining portions engage an indentation on the pipe when the pipe is in an inserted position in the pipe opening and the axially extending inwardly angled resilient retaining tabs have moved to a first locked position to retain the pipe in the inserted position; wherein relative movement of the axially extending inwardly angled resilient retaining tabs of the retaining ring assembly with respect to the fitting body from the first locked position to a second unlocked position causes the pipe retaining portions of each axially extending inwardly angled resilient retaining tab to disengage from the indentation on the pipe and to permit removal of the pipe from the inserted position in the fitting body.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 8 is a detailed view of the connect/disconnect fitting connection shown in FIG. 6 with the retaining ring in the second unlocked position permitting removal of the pipe.

FIG. 9 is a cross-sectional perspective view of the connect/disconnect fitting connection shown in FIG. 2 with a pipe being inserted into the pipe connection to releasably connect the pipe to the pipe opening of the connect/disconnect fitting connection.

FIG. 14 is an enlarged cross-sectional view of one of the plurality of axially extending inwardly angled resilient retaining tabs having a pipe retaining portion engaging an indentation of the pipe in accordance with the second embodiment.

DETAILED DESCRIPTION OF THE PREFERRED EMBODIMENTS

Figure 1:
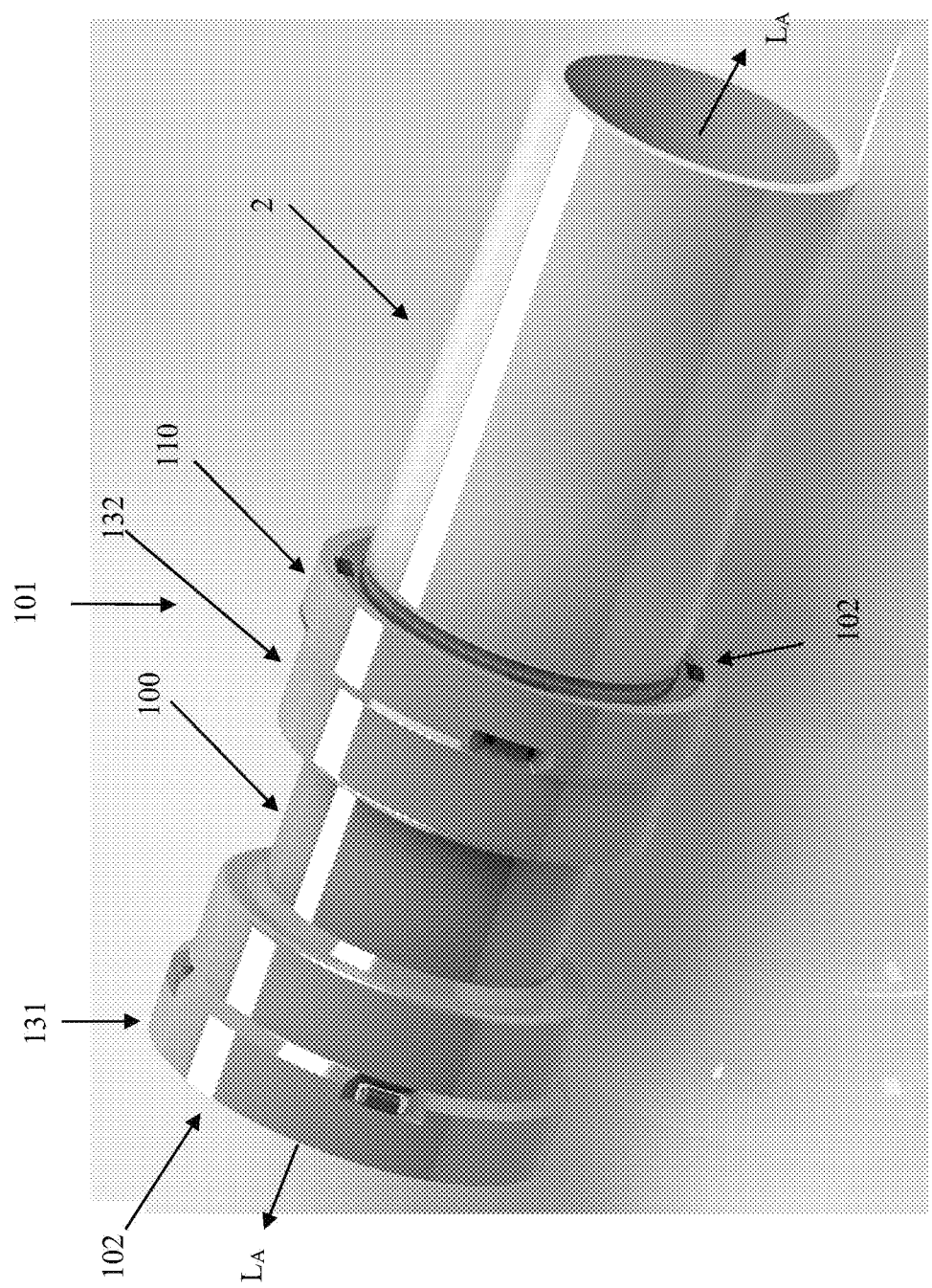
FIG. 1 is an external perspective view of a pipe coupling having a connect/disconnect fitting connection according to one embodiment of the present invention at both ends of the pipe coupling with a pipe inserted at one end of the pipe coupling.

Preferred embodiments of the invention and its advantages can be understood by referring to the present drawings. In the present drawings, like numerals are used for like and corresponding parts of the accompanying drawings. Also, the following preferred embodiments and detailed description illustrate and describe non-limiting features of the invention.

One or more of the preferred embodiments described herein relates to a connection to releasably connect a pipe to a fitting. The fitting can be any type of fitting. The connection preferably comprises a fitting body having a pipe opening for axially receiving a pipe along a longitudinal axis. The connection also comprises a retaining ring. The retaining ring, in at least one embodiment, has at least one, and preferably two, four, six or eight (depending on the size of the connection and the pipe) forwardly extending resilient retaining tabs, each resilient retaining tab having a radially inwardly extending portion, and, a radially outwardly extending portion. The radially inwardly extending portions are operable to engage the pipe when the pipe is in the inserted position and the retaining ring is in a first locked axial position to retain the pipe in the inserted positon. Preferably, the pipe will have at least one groove, and/or other types of indentation, and the radially inwardly extending portions will engage the indentations, such as the at least one groove, as the pipe is inserted into the connection. The radially outwardly extending portions extend through a corresponding body radial opening of the fitting body. The radially outwardly extending portions have a chamfered body engaging surface which operatively engages an angled tab engaging surface of the corresponding body radial opening through which it passes.

Insertion of the pipe into the connection can be made in a number of ways, including simply manually inserting the pipe into the pipe opening of the fitting body. Typically, no solvent or other chemical means or chemical pre-treatment of the pipe or the connection are required. However, it is preferred if the pipe has at least one surface indentation, such as a groove, or dimples, or other types of indentations, formed on the exterior of the pipe prior to insertion of the pipe into the pipe opening, which groove, or other indentations, may be engaged by the radially inwardly extending portions of the forwardly extending resilient retaining tabs.

When the pipe is to be removed or disconnected from the pipe connection, relative axial movement of the retaining ring with respect to the fitting body from a first locked axial position to a second unlocked axial positon causes the chamfered body engaging surfaces of each of the radially outwardly extending portions to operatively engage the angled tab engaging surface of the corresponding body radial opening to resiliently radially outwardly deform each of the resilient retaining tabs. This causes the radially inwardly extending portions of the resilient retaining tabs to disengage from the pipe permitting removal of the pipe from the inserted position in the fitting body. Preferably, the connection further comprises a separate removal tool which can engage the retaining ring to relatively axially move the retaining ring with respect to the fitting body from the first locked axial position to the second unlocked axial position. More preferably, the retaining ring is annularly shaped and substantially contained within the fitting body. The removal tool may fit between the pipe and the pipe opening of the fitting body to engage the retaining ring permitting axially movement of the retaining ring from the first locked axial position to the second unlocked axial position by moving the retaining ring further into the pipe opening of the fitting body.

In a further preferred embodiment, the connection may also comprise a retaining ring assembly having axially extending inwardly angled resilient retaining tabs, each of which has a pipe retaining portion for engaging the at least one indentation, such as a groove, or dimples, on the pipe when the tabs are in the first locked position. Relative movement of the axially extending inwardly angled resilient retaining tabs with respect to the fitting body from the first locked position to a second unlocked position causes the tab retaining portions to disengage from the indentation on the pipe permitting removal of the pipe from the inserted position in the fitting body. Relative movement of the axially extending inwardly angled resilient retaining tabs may be accomplished by a separate removal tool which engages the axially extending inwardly angled resilient retaining tabs to move them, which in one embodiment may include prying them, from the first locked position, engaging the indentation on the pipe, to a second unlocked position, disengaged from the indentation on the pipe thereby permitting removal of the pipe from the fitting. Preferably, the retaining ring assembly is substantially contained within the fitting body so as not to extend beyond the pipe opening. In preferred embodiments, the retaining ring assembly is fixed to an inner sidewall or surface of the pipe opening with the retaining ring assembly located within or flush with the pipe opening of the fitting body. This provides a retaining ring assembly which may be contained within the fitting body and located within or flush with the pipe opening of the fitting body and having tabs which may be moved from a first locked position to a second unlocked position by means of a separate removal tool which can be axially moved within the first opening while the pipe is in the inserted position. In this way, this further preferred embodiment provides a releasable connect/disconnect connection whereby the pipe can be releasably connected to the fitting.

These and other preferred embodiments, as well as non-limiting features of the invention will be further described below in more detail with respect to the Figures.

As shown in FIG. 1, one embodiment of the present invention relates to a fitting, shown generally by reference numeral 100, having a connection, shown generally by reference numeral 110, according to one embodiment of the present invention. The connection 110 may connect and disconnect a pipe, shown generally by reference numeral 2, to the fitting 100. As shown in FIG. 1, the fitting 100 is a pipe coupling 101, however, it is understood that the connection 110 could be used with any type of fitting, including, but not limited to, elbow fittings, tee fittings, wye fittings, pipe reducing fittings and pipe expanding fittings, P traps, S traps, end caps, as well as various types of flanges. The connection 110 is also mechanical, in that no solvents or other chemicals are required.

Furthermore, in the embodiment illustrated in the present figures, the pipe coupling 101 has a first end 131 and a second end 132 for coupling two pipes together. In the embodiment illustrated in the present figures, the pipe coupling 101 has a connection 110 according to the present invention at both ends 131, 132. However, it is understood that it is not necessary that the pipe coupling 101 have a pipe connection 110 according to the present invention at both ends 131, 132, and only one of the ends 131, 132 may have a connection 110 according to the present invention.

Figure 4:
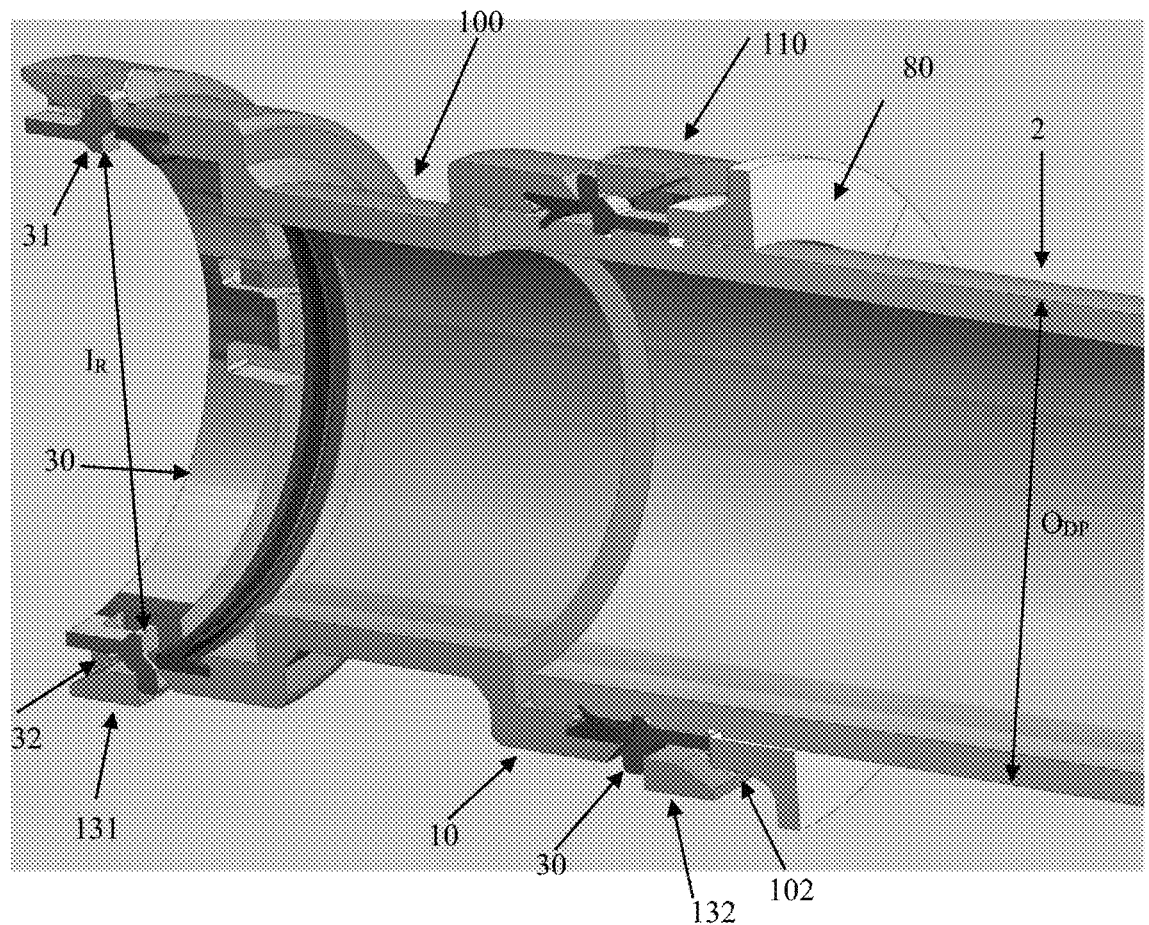
FIG. 4 is a cross-sectional view of the connect/disconnect fitting connection shown in FIG. 2 with the pipe in the inserted position and the pipe removal tool about to engage the retaining ring according to one embodiment of the present invention.
Figure 5:
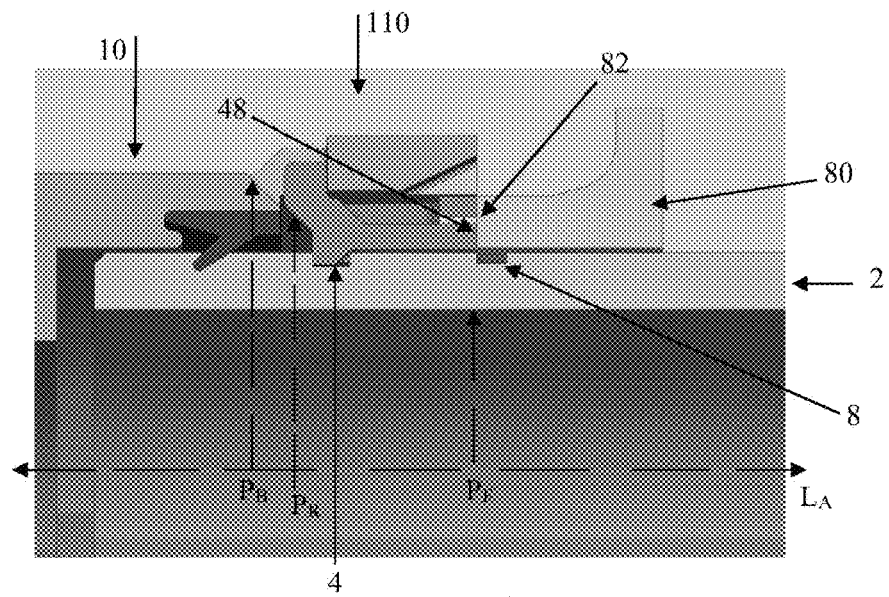
FIG. 5 is a cross-sectional view of the connect/disconnect fitting connection shown in FIG. 4 in more detail with the pipe in the inserted position and the pipe removal tool about to engage the retaining ring.
Figure 6:
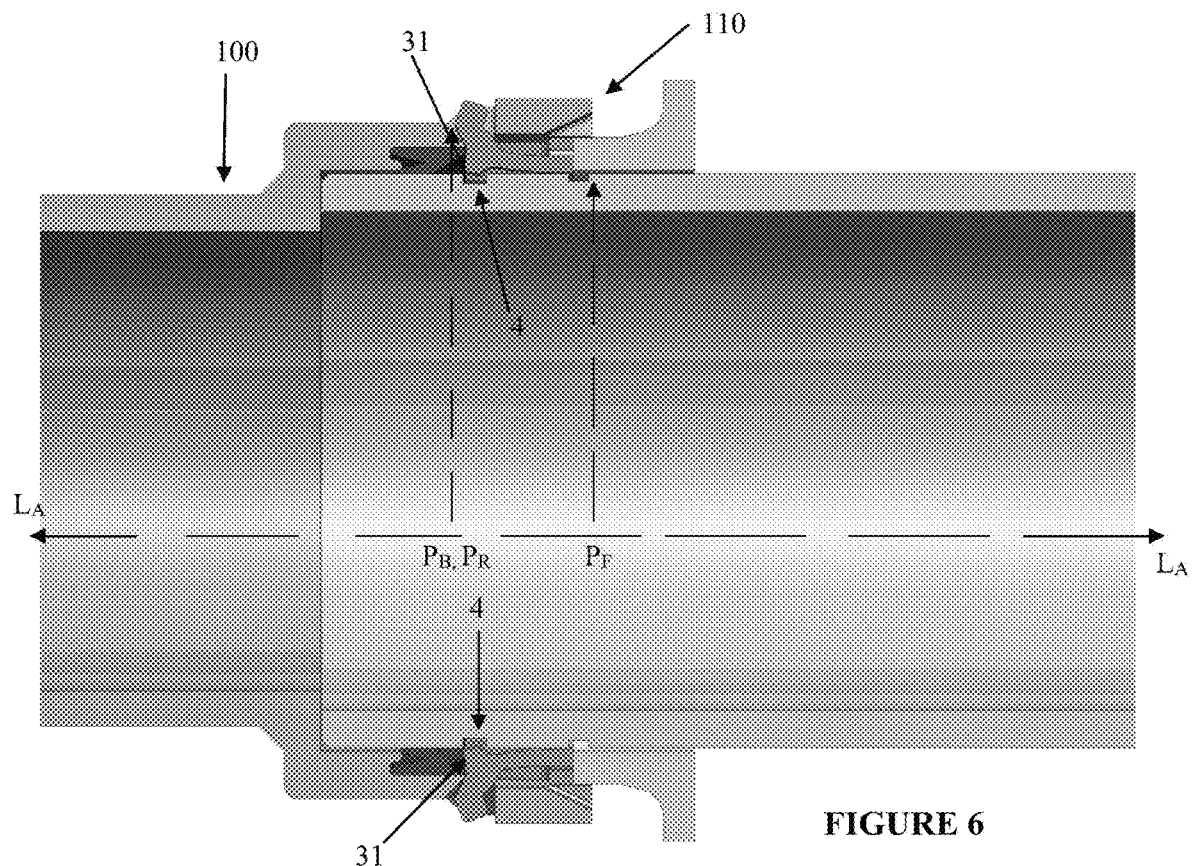
FIG. 6 is a cross-sectional view of the connect/disconnect fitting connection shown in FIG. 4 with the pipe in the inserted position and the pipe removal tool engaging the retaining ring to relatively axially move the retaining ring with respect to the fitting body from the first locked axial position to the second unlocked axial position permitting removal of the pipe.
Figure 7:
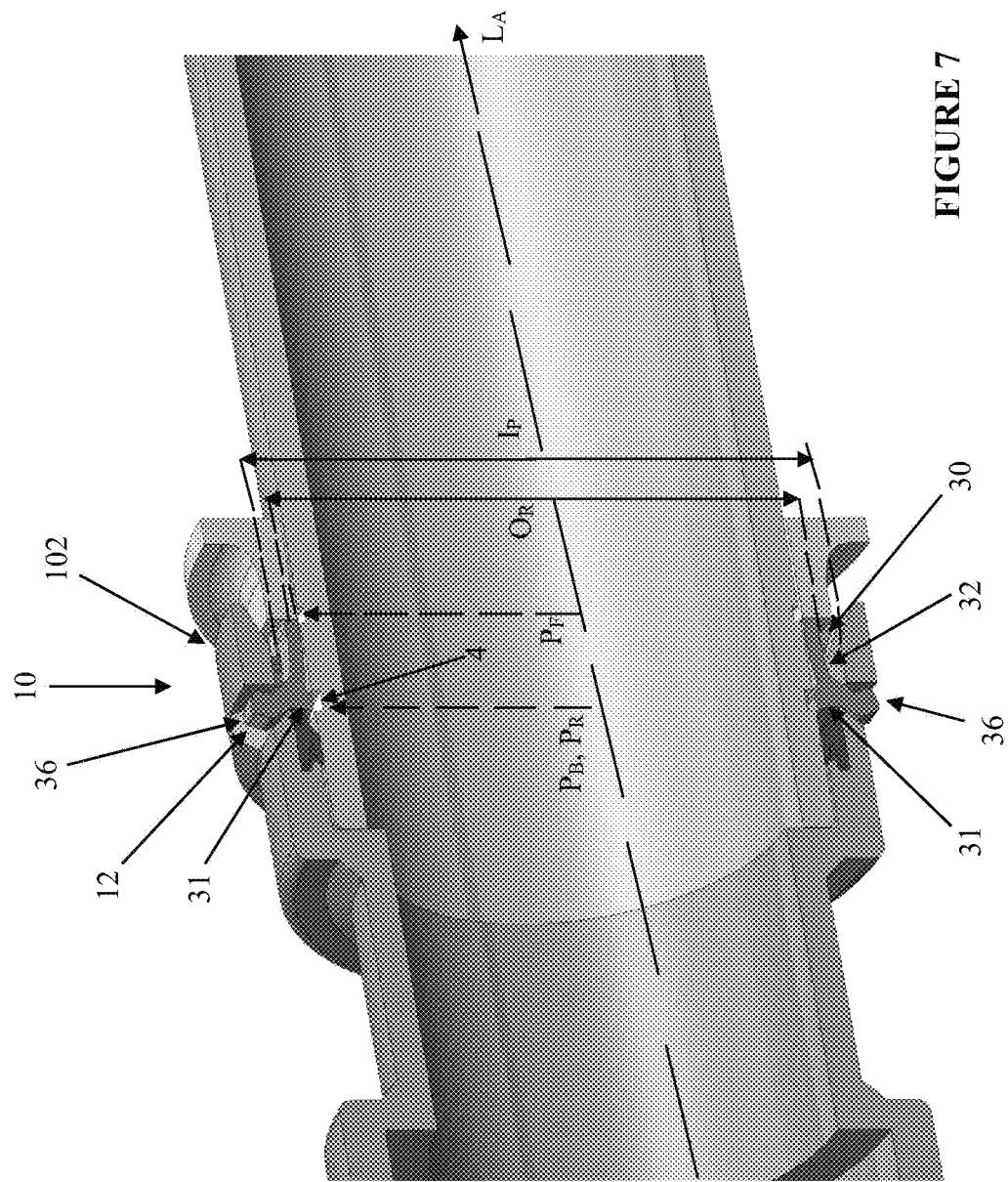
FIG. 7 is a cross-sectional view of the connect/disconnect fitting connection shown in FIG. 6 with the retaining ring in the second unlocked position permitting removal of the pipe.
Figure 10:
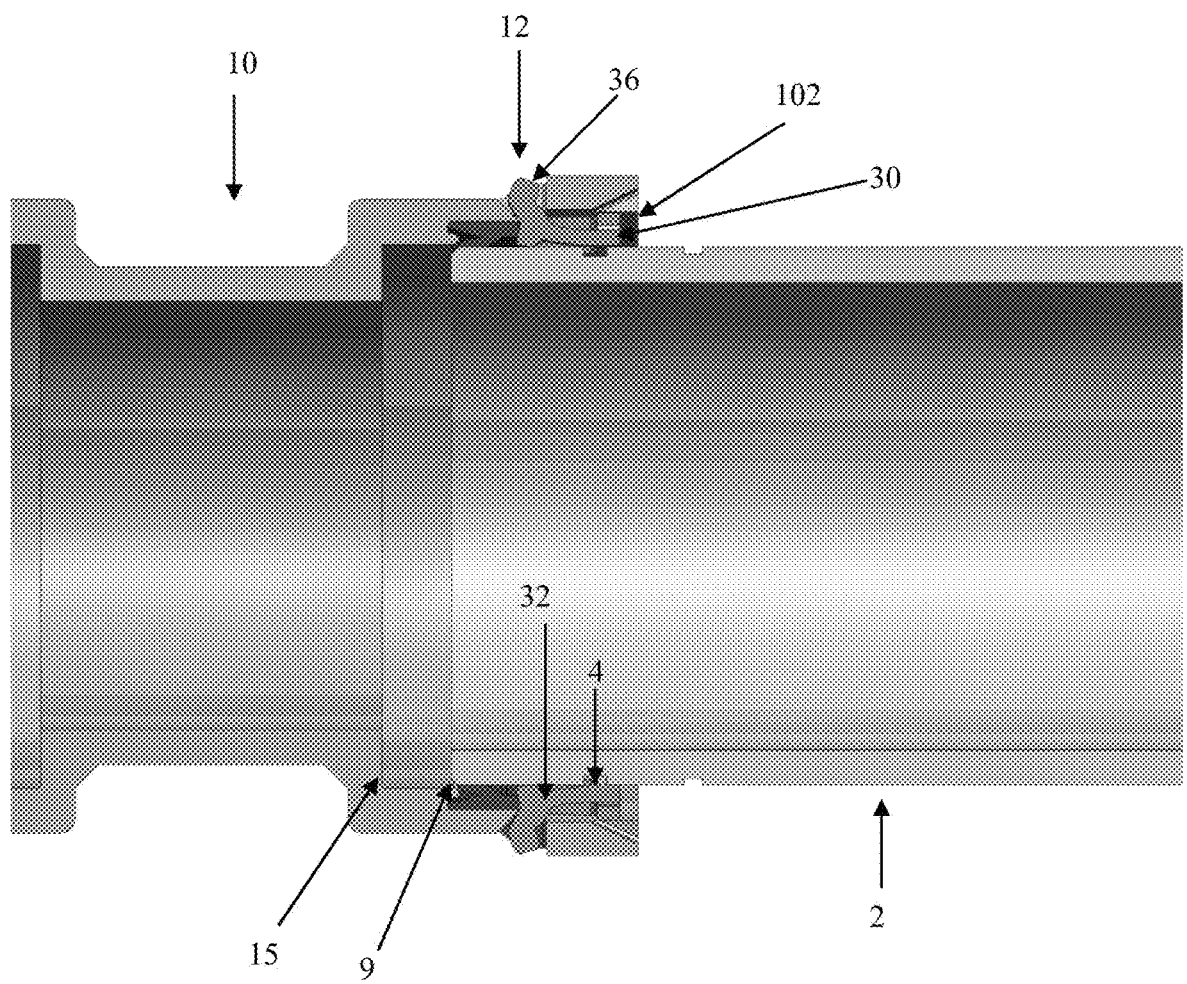
FIG. 10 is a cross-sectional view of the connect/disconnect fitting connection shown in FIG. 9 with a pipe being inserted into the pipe opening of the pipe connection to releasably connect the pipe to the connect/disconnect fitting connection.
Figure 11:
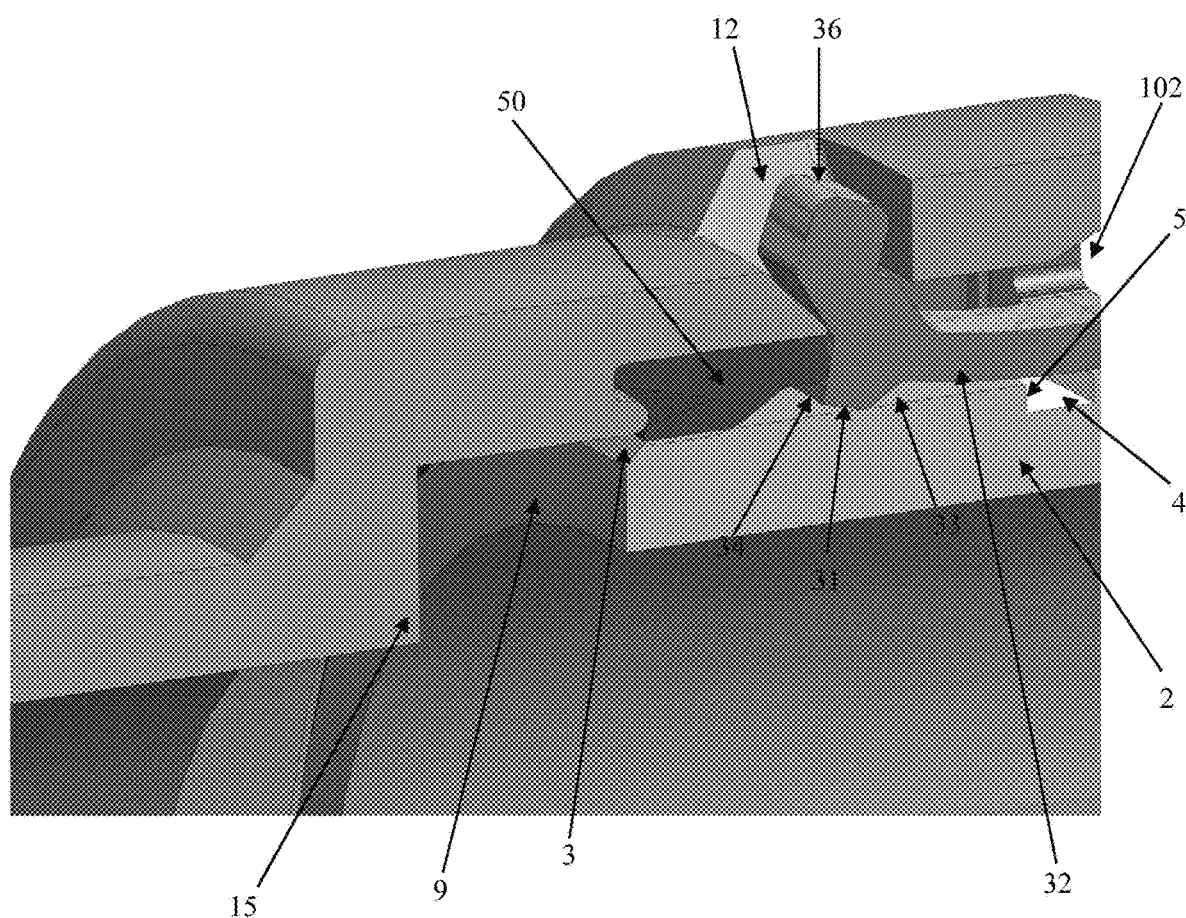
FIG. 11 is a detailed view of FIG. 9 with a pipe being inserted into the pipe opening of the pipe connection to releasably connect the pipe to the connect/disconnect fitting connection.

For ease of illustration, while both ends 131, 132 of the pipe coupling 101 illustrated in the figures have connections 110 pursuant to at least some embodiments of the present invention, pipe 2 is shown being inserted only into the second end 132 of the pipe coupling 101. The first end 131 of the pipe coupling 101 shows the pipe connection 110 without a pipe (not shown) inserted to assist in illustrating the pipe connection 110, but it is understood that in use, a pipe (not shown) would be connected to the pipe connection 110 at the first end 131 also. Furthermore, as described in the brief description, FIGS. 1, 2 and 3 of the present invention illustrate the pipe 2 in the inserted position at the second end 132 with the connection 110 engaging the pipe 2 to resist removal of the pipe. FIGS. 4 and 5 illustrate the connection 110 about to be disengaged from the pipe 2 to permit removal of the pipe. FIGS. 6, 7 and 8 illustrate the connection 110 disengaging from the pipe 2 to permit removal of the pipe. FIGS. 9, 10 and 11 illustrate the initial insertion of the pipe 2 into the second end 132 of the pipe coupling 101 prior to the connection 110 engaging and connecting to the pipe 2.

Figure 2:
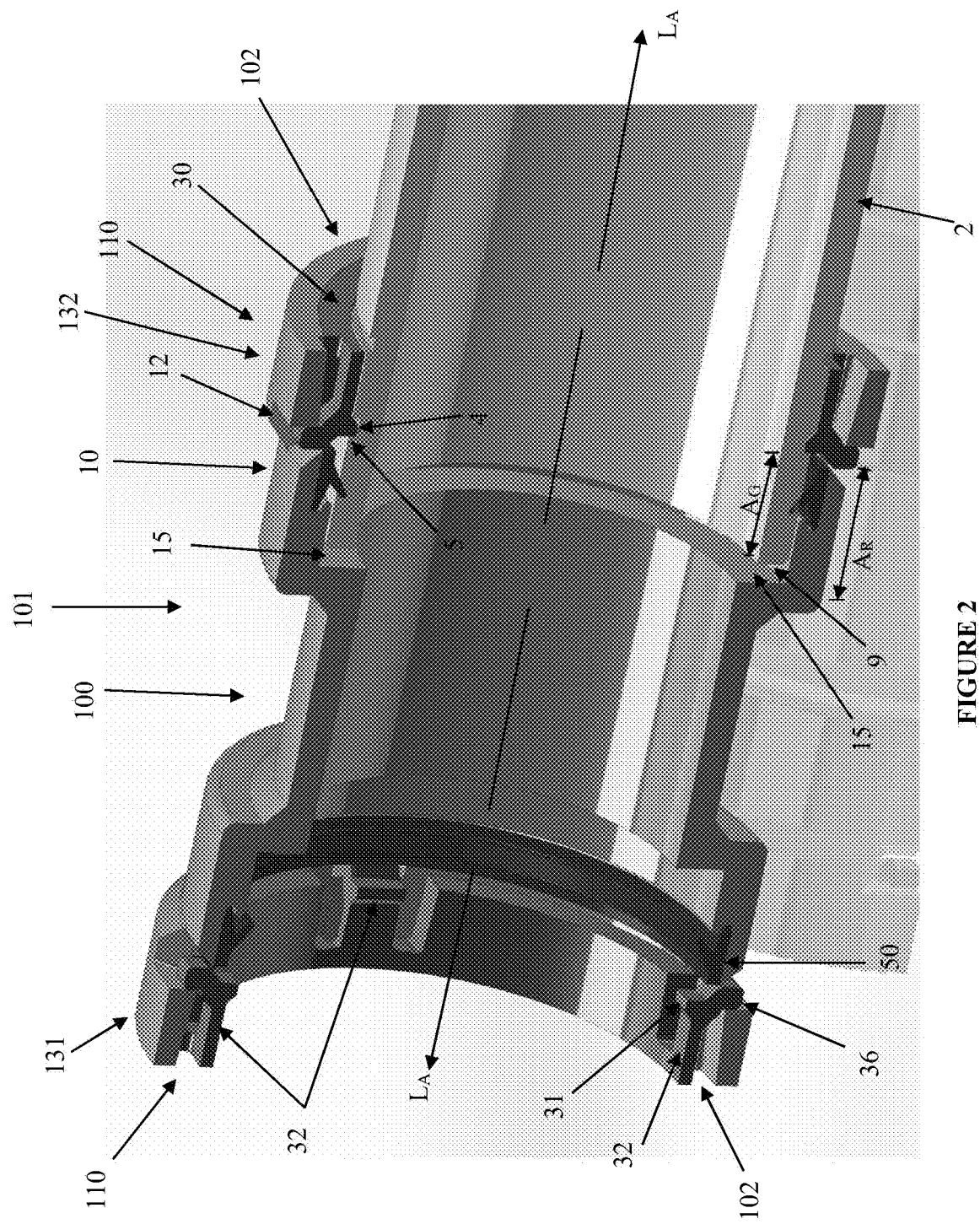
FIG. 2 is a cross-sectional perspective view of the pipe coupling shown in FIG. 1 with a connect/disconnect fitting connection according to one embodiment of the present invention at both ends of the pipe coupling and a pipe in the inserted position at one end of the pipe coupling with the retaining ring in the first locked axial positon.
Figure 3:
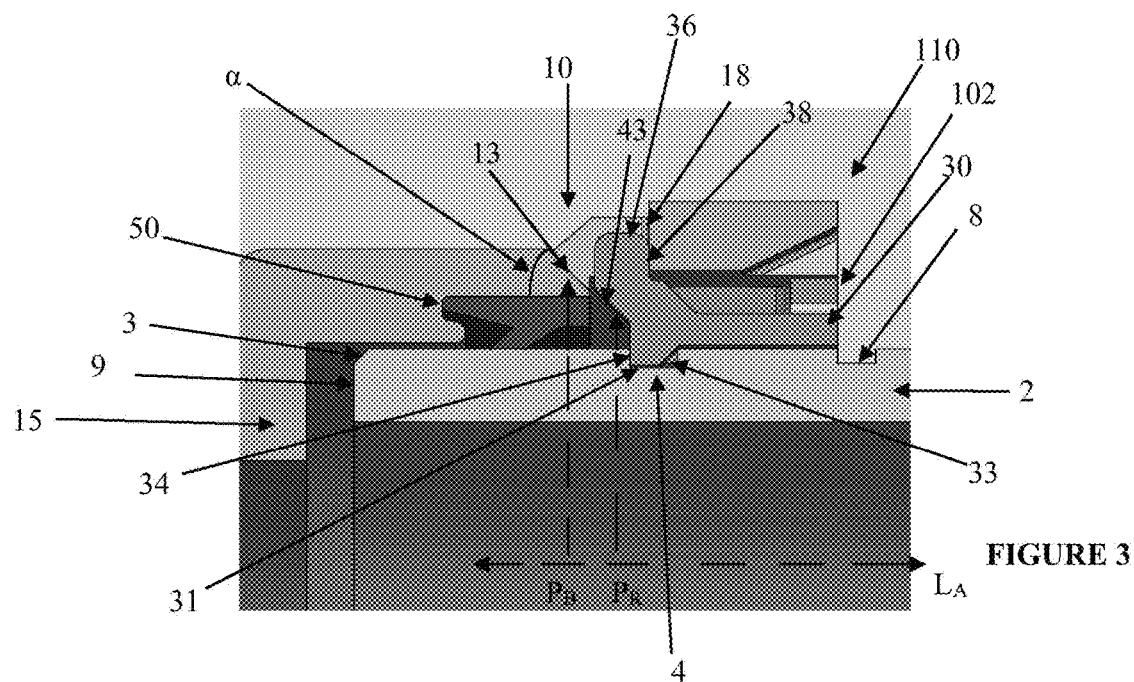
FIG. 3 is a cross-sectional view of the connect/disconnect fitting connection shown in FIG. 2 in more detail with the pipe in the inserted position and the retaining ring in the first locked axial position.

As illustrated in FIGS. 1, 2 and 3, the connection 110 preferably comprises a fitting body 10 having or defining a pipe opening 102 of the fitting 100 for axially receiving the pipe 2 along a longitudinal axis, shown generally by the dash lines identified as $L_A$ in FIGS. 1 and 2. The fitting body 10 also preferably comprises at least one, and likely two or more, body radial openings, shown by reference numeral 12, extending radially from the longitudinal axis $L_A$. Each body radial opening 12 has an angled tab engaging surface 13, illustrated for instance in FIGS. 2 and 3.

The connection 110 also preferably comprises a retaining ring, shown generally by reference numeral 30, having at least one, and preferably two or more axially extending resilient retaining tabs 32. Each resilient retaining tab 32 has a radially inwardly extending portion 31 and a radially outwardly extending portion 36. Preferably, the number of retaining tabs 32 will be the same, or less than, the number of body radial openings 12, such that each outwardly extending portion 36 of the retaining tab 32 will be received by and/or pass through a corresponding body radial opening 12. Furthermore, it is understood that the retaining tabs 32 and the body radial openings 12 are preferably equally radially spaced about the connection 110 and the total number of body radial openings 12 and retaining tabs 32 will be a function of the size of the pipe to be inserted into the connection 110, the type of pipe and other design constrains and requirements. Accordingly, depending on the size of the pipe 2, there may be 2, 3, 4, 6, 8 or more body radial openings 12 and a corresponding number of retaining tabs 32. Generally, there will be an even number of body radial openings 12 and corresponding retaining tabs 32 located equidistantly about the circumference of the opening 102. It is understood, however, that in some cases, there may be more body radial openings 12 than retaining tabs 32.

Each of the radially outwardly extending portion 36 preferably have a chamfered body engaging surface 43 which is able to operatively engage the corresponding angled tab engaging surface 13 of the corresponding body radial opening 12 in which the radially outwardly extending portion 36 extends. The chamfered body engaging surface 43 operatively engages the angled tab engaging surface 13 of the corresponding body radial opening 12 when the retaining ring 30 is relatively axially moved with respect to the fitting body 10 from the first locked axial position to the second unlocked axial position as described more fully below.

As described above, FIGS. 1, 2 and 3 show the pipe 2 in the inserted position and the retaining ring 30 in the first locked axial position. In this first locked axial position, the radially inwardly extending portions 31 engage the pipe 2 when the pipe 2 is in the inserted position to retain the pipe 2 in the inserted position. Each of the radially inwardly extending portions 31 preferably have a pipe retaining surface 34 for retaining the pipe 2 in the inserted position when the retaining ring 30 is in the first locked axial position. The pipe 2 preferably has at least one indentation, such as at least one groove 4, or at least one dimple (not shown) and the pipe retaining surface 34 of at least one radially inwardly extending portion 31 preferably engages such indentations, for example, by engaging an inner wall 5 of the groove 4 facing the pipe opening 102.

As also illustrated in FIG. 2, the connection 110 preferably has a stop wall 15 formed integrally with the fitting body 10. The stop wall 15 limits axial insertion of the pipe 2 into the fitting body 10 and specifically the pipe opening 102. This prevents an insertion end 9 of the pipe 2 from being overly inserted into the fitting body 10. Furthermore, the pipe retaining surface 34 of the at least one radially inwardly extending portion 31 has an axial position $A_R$ (see FIG. 2) in the fitting body 10 with respect to the stop wall 15 which corresponds to an axial position $A_G$ (see FIG. 2) of the at least one groove 4 with respect to an insertion end 9 of the pipe 2, such that the insertion end 9 of the pipe 2 is near, but not adjacent to, the stop wall 15 when the pipe 2 is in the inserted position, as illustrated for instance, in FIGS. 2 and 3.

As also illustrated in FIGS. 2 and 3, in a preferred embodiment, each of said radially outwardly extending portions 36 extend through the corresponding body radial opening 12 of the fitting body 10. In this way, the body radial openings 12 of the fitting body 10 are open to an exterior surface of the fitting body 10, as illustrated for instance in FIGS. 1, 2 and 3. This permits visible inspection of the radially inwardly extending portions 31 when they are engaging the pipe 2, and in particular, the at least one groove 4 or other indentation (not shown) when the pipe 2 is in the inserted position. In this way, physical inspection can be made whether or not the pipe 2 is in the inserted position (shown in FIGS. 1, 2 and 3), as well as whether or not the radially inwardly extending portions 31 have engaged the pipe 2.

In a further preferred embodiment, and presuming a water tight seal is desired, a gasket 50 may be located between the insertion end 9 of the pipe 2 and the retaining ring 30 when the pipe 2 is in the inserted position and the retaining ring 30 is in the first locked axial position, as illustrated for instance in FIG. 2. In this way, the gasket 50 may provide a seal to the fitting body 10 even if the radial openings 12 are open through to the exterior surface of the fitting body 10 permitting visible inspection of the radially inwardly extending portions 31 engaging the pipe 2 when the pipe 2 is in the inserted position and the retaining ring 30 is in the first locked axial position.

In a further preferred embodiment, as illustrated in FIG. 2 and detailed FIG. 3, each radial body opening 12 further preferably comprises a radial tab engaging surface, shown generally by reference numeral 18. The radial tab engaging surface 18 faces the angled tab engaging surface 13 of the body opening 12. Each of the radially outwardly extending portions 36 of the resilient retaining tabs 32 extends through the corresponding body opening 12 of the fitting body 10 as discussed above. Preferably, each radially outwardly extending portions 36 comprises an axial stop surface, shown generally by reference numeral 38 in FIG. 3, which engages the radial tab engaging surface 18 of the corresponding body opening 12 when the retaining ring 30 is being axially moved with respect to the fitting body 10 towards the pipe opening 102. In this way, the interaction of the radial tab engaging surface 18 of each body opening 12, and, the axial stop surface 38 of each radially outwardly extending portion 36 extending through the corresponding body radial opening 12 prevents relative axial movement of the retaining ring 30 in a direction towards the pipe opening 102 of the fitting body 10, and thereby prevent potentially undesirable removal of the retaining ring 30 from the fitting 100.

Furthermore, as also illustrated in FIG. 3, the radial tab engaging surface 18 of each radial body opening 12 is substantially perpendicular to the longitudinal axis $L_A$ of the fitting body 10. Similarly, it is preferred that the angled tab engaging surface 13 of each radial body opening 12 be oriented at an acute forward angle α to the longitudinal axis $L_A$. In this way, the radial tab engaging surface 18 acts as an axial stop for the radially outwardly extending portions 36 preventing undesired axial removal of the retaining ring 30 from the connection 110 and potentially unintentional removal from the fitting 100, and, the angled tab engaging surface 13 being at an acute forward angle α to the longitudinal axis $L_A$ facilitates the resilient radial outward deformation of each resilient retaining tab 32 to disengage the radially inwardly extending portion 31 from the pipe 2 as discussed more fully below.

With comparison of FIGS. 1, 2 and 3 showing the retaining ring 30 in the first locked axial position, and FIGS. 6, 7 and 8, showing the retaining ring 30 in the second unlocked axial position, it is apparent that relative axial movement of the retaining ring 30 with respect to the fitting body 10 from the first locked axial position to the second unlocked axial position causes the chamfered body engaging surface 43 of each radially outwardly extending portion 36 to operatively engage the angled tab engaging surface 13 of the corresponding body radial opening 12. In this way, each of the resilient retaining tabs 32 are resiliently radially outwardly deformed, which has the effect of causing the radially inwardly extending portion 31 of each of the resilient retaining tabs 32 to disengage from the pipe 2. This is illustrated for instance in FIGS. 6, 7 and 8 where the radially inwardly extending portions 31 have been removed from the groove 4. More particularly, the retaining surface 34 of the radially inwardly engaging portion 31 no longer engages the inner wall 5 of the at least one groove 4, because the angled tab engaging surface 13 of the corresponding body radial opening 12 has engaged the chamfered body engaging surface 43 of the corresponding radially outwardly extending portion 36 to resiliently radially outwardly deform the resilient retaining tab 32, disengaging the radially inwardly extending portion 31 from the indentation, in this preferred embodiment, the groove 4 on the pipe 2. When the retaining ring 30 is in the second unlocked axial position, and, the radially inwardly extending portions 31 no longer engages the pipe 2, the pipe 2 may be removed from the inserted position of the fitting body 10. In this way, the connection 110 may releasably disconnected the pipe 2 from the fitting 100 permitting removal of the pipe 2 from the fitting body 10.

Once the pipe 2 has been removed from the connection 110, both the connection 110 and the pipe 2 could be reused. In other words, the pipe 2 may be connected to the same connection 110, or a different connection 110 on another fitting (not shown). Likewise, the connection 110 on the second end 132 of the pipe coupling 101 shown in FIGS. 6, 7 and 8 could be reused with another pipe (not shown).

It is apparent that the relative axial movement of the retaining ring 30 with respect to the fitting body 10 from the first locked axial position to the second unlocked axial position results from the retaining ring 30 moving axially forward further into the fitting body 10. It should be appreciated that this relative axial movement can occur in any number of ways. For instance, it can be done through physical means or even through electromagnetic means if magnetic elements are used in the retaining ring 30. It is preferred that the relative axial movement of the retaining ring 30 with respect to the fitting body 10 from the first locked axial position to the second unlocked axial position results from the retaining ring 30 moving axially forward into the fitting body 10. This, in general, is a more difficult movement, particularly when removal of the pipe 2 requires axial movement in the opposite axial direction, thereby decreasing the likelihood of unauthorized or undesired improper movement of the retaining ring 30 to the second unlocked axial position, and undesired removal of the pipe 2 from the inserted position of the fitting body 10.

The relative interaction of each of the retaining tabs 32 with the corresponding body radial opening 12 as the retaining ring 30 moves axially forward with respect to the fitting body 10 from the first locked axial position to the second unlocked axial position will now be described in more detail with respect to a preferred embodiment illustrated in FIGS. 3 and 8. As illustrated in FIG. 3, when the retaining ring 30 is in the first locked axial position with respect to the body fitting 10, the chamfered body engaging surface 43 of each radially outwardly extending portion 36 is in an axial position, shown generally by reference $P_R$, which is axially offset from the angled tab engaging surface 13 of the corresponding body radial opening 12, shown generally by reference $P_B$, through which the radially outwardly extending portion 36 extends. By comparison, as illustrated in FIGS. 6, 7 and 8, when the retaining ring 30 is in the second unlocked axial position with respect to the body fitting 10, the chamfered body engaging surface 43 of each radially outwardly extending portion 36 is axially aligned with the angled tab engaging surface 13 of the corresponding body radial opening 12 illustrated by the axial positions $P_B$ and $P_R$ shown overlapping in FIGS. 6, 7 and 8, such that the chamfered body engaging surface 43 operatively engages the angled tab engaging surface 13 of the corresponding body radial opening 12. In this way, the operative interaction of the chamfered body engaging surface 43 of each radially outwardly extending portion 36 with the angled tab engaging surface 13 of the corresponding body radial opening 12 translates the relative axial movement of the retaining ring 30 with respect to the fitting body 10 from the first locked axial position to the second unlocked axial position into radial movement of each resilient retaining tab 32 from a radially locked position, as shown in FIG. 3 where the radially inwardly extending portion 31 is engaging the pipe 2 to retain the pipe 2 in the inserted portion, to a radially unlocked position, as shown in FIG. 8, where the radially inwardly extending portion 31 is disengaged from the pipe 2, permitting removal of the pipe 2 from the inserted position and the fitting body 10.

While the relative axial movement of the retaining ring 30 with respect to the fitting body 10 from the first locked axial position to the second unlocked axial position may be performed in a number of ways, in a preferred embodiment, the connection 110 comprises a removal tool, shown generally by reference numeral 80, to engage the retaining ring 30 facilitating relative axial movement of the retaining ring 30 with respect to the fitting body 10 from the first locked axial position to the second unlocked axial position. The removal tool 80 is shown in FIGS. 4 to 8, however, in FIGS. 4 and 5, the removal tool 80 is shown engaging the retaining ring 30 while the retaining ring 30 is still in the first locked axial position, and, in FIGS. 6 to 8, the removal tool 80 is shown engaging the retaining ring 30 while the retaining ring 30 is shown in the second unlocked axial position.

As illustrated in FIG. 5, the retaining ring 30 preferably comprises a removing tool engaging surface 48 which is located within or flush with the pipe opening 102 of the fitting body 10. The removal tool 80 preferably also comprises a retaining ring engaging surface 82 which engages the removing tool engaging surface 48 of the retaining ring 30 to facilitate relative axial movement of the retaining ring 30 with respect to the fitting body 10. Preferably, the retaining ring 30 is annularly shaped and substantially contained within the fitting body 10 when the pipe 2 is in the inserted position as shown in FIG. 5. More preferably, and is shown in FIG. 7, the annularly shaped retaining ring 30 has an outer diameter, shown generally by reference numeral $O_R$, which is less that the inner diameter, shown generally by reference numeral $I_P$ of the pipe opening 102, such that the retaining ring 30 is substantially contained within the pipe opening 102. In this way, the retaining ring 30 is concealed from, or at least not exposed to the outer elements, which lessens the likelihood that the retaining ring 30 would be moved unintentionally and undesirably from the first locked axial position to the second unlocked axial position. While the retaining ring 30 may have an outer diameter $O_R$ which is less than the inner diameter $I_P$ of the pipe opening 102, each of the radially outwardly extending portions 36 may extend radially outwardly through the corresponding body radial opening 12 of the fitting body 10 beyond the inner diameter $I_P$ of the pipe opening 102 to permit visual inspection of the movement of the radially outwardly extending portions 36 through the radial openings 12 to ensure the pipe 2 has been correctly engaged and/or disengaged from the connection 110.

Preferably, the removal tool 80 may fit between the pipe 2 and the pipe opening 102 of the fitting body 10 when the pipe 2 is in the inserted position to engage the removing tool engaging surface 48 of the retaining ring 30. In this way, axial movement of the removal tool 80 against the removing tool engaging surface 48 of the retaining ring 30 while holding the fitting body 10, permits axial movement of the retaining ring 30 forward and further into the pipe opening 102 of the fitting body 10 from the first locked axial position to the second unlocked axial position. In a preferred embodiment, the removal tool 80 may be composed of two parts that fit against at least a portion, and preferably all, of the removal tool engaging surface 48 of the retaining ring 30. The two parts of the removal tool 80 may be identical and fit together. In this way, the removal tool 80 may be able to apply equal axial force along the entire removal tool engaging surface 48 of the retaining ring 30 to provide even translation movement of the retaining ring 30 from the first locked axial position to the second unlocked axial position.

As illustrated in FIG. 5, in a preferred embodiment, the removing tool engaging surface 48 of the retaining ring 30 is located flush with the pipe opening 102 of the fitting body 10, shown generally by reference $P_F$, or slightly within the fitting body 10. In this way, the retaining ring 30 is protected by the pipe opening 102, and it is less likely that the retaining ring 30 will be improperly engaged and inadvertently moved axially forward, thereby unintentionally disengaging the connection 110. Furthermore, as also illustrated in FIG. 5, in a further preferred embodiment, the pipe 2 may have a further indentation or marking, such as the second groove, shown generally by reference numeral 8. This second groove 8 may be formed on the pipe 2 at the same time that the first groove 4 is formed. The second groove 8 may preferably also be located at the flush position $P_F$ of the pipe opening 102 of the fitting body 10 when the pipe 2 is in the inserted position, as illustrated in FIG. 5. In this way, the second groove 8 being aligned with the flush position $P_F$ at the entrance of the pipe opening 102 may act as a further visual indication to the user of the connection 110 that the pipe 2 is in the inserted position (as shown in FIGS. 1 to 5) and the radially inwardly extending portion 31 of the retaining tabs 32 has engaged the pipe 2 to retain the pipe 2 in the inserted position.

As discussed above, FIGS. 9 to 11 illustrate the initial insertion of the pipe 2 into the second end 132 of the pipe coupling 101 prior to the connection 110 engaging and connecting to the pipe 2. As illustrated in FIGS. 9, 10 and 11, the pipe 2 is axially inserted into the fitting body 10 through the pipe opening 102. As illustrated in the Figures, the pipe 2 is inserted into the pipe opening 102, the pipe 2 engages the radially inwardly extending portion 31 and resiliently radially outwardly deforms the resilient retaining tabs 32, permitting axial insertion of the pipe 2 into the pipe opening 102 of the fitting body 10. To facilitate axial insertion of the pipe 2, the pipe 2 preferably has a pipe chamfered edge, shown generally by reference numeral 3 in FIG. 11, at the insertion end 9 of the pipe 2. The pipe chamfered edge 3 preferably engages the chamfered pipe engaging surface 33 of the retaining tabs 32 during axial insertion of the pipe 2 to resiliently outwardly deform the resilient retaining tabs 32, permitting axial insertion of the pipe 2 to the inserted position.

As illustrated in the Figures, the inner diameter, shown by $I_R$, at the first end 131 of the pipe coupling 101 in FIG. 4 of the radially inwardly extending portions 31 when they are at rest, is less than the outer diameter $O_{DP}$ of the pipe 2. In this way, when the pipe 2 is inserted to the inserted position, resilient retaining tabs 32 are suddenly resiliently inwardly deformed into the external groove 4, or other indentions, permitting the pipe retaining surface 34 to engage the pipe 2. This sudden resilient inward deformation of the tabs 32, may make an audible sound, such as a snapping sound. This snapping sound is a further audible indication that the pipe 2 is in the inserted position and the radially inwardly extending portions 31 have engaged the pipe 2.

As illustrated in FIG. 11, in a preferred embodiment, the pipe 2 has a groove 4 with at least the inner wall 5 as discussed above. The insertion of the pipe 2 into the pipe opening 102 to the inserted position causes the pipe retaining surface 34 of at least one radially inwardly extending portion 31 to operatively engage the inner wall 5 of the at least one external groove 4 of the pipe 2 to retain the pipe 2 in the inserted position while the retaining ring 30 remains in the first locked axial position.

Reference is now made to FIGS. 12 to 31 which show a releasable connect/disconnect fitting connection 110 in accordance with the second embodiment of the present invention. Like numerals are used to denote like components with the first embodiment shown in FIGS. 1 to 11.

As in the releasable connect/disconnect connection 110 of the first embodiment of the invention shown in FIGS. 1 to 11, the releasable connect/disconnect connection 110 of the second embodiment of the invention shown in FIGS. 12 to 31 releasably connects the fitting 100 to a pipe 2. The pipe 2 is identical in structure and function to the pipe 2 discussed in the first embodiment including the at least one groove 4 or other indentation (not shown).

Figure 12:
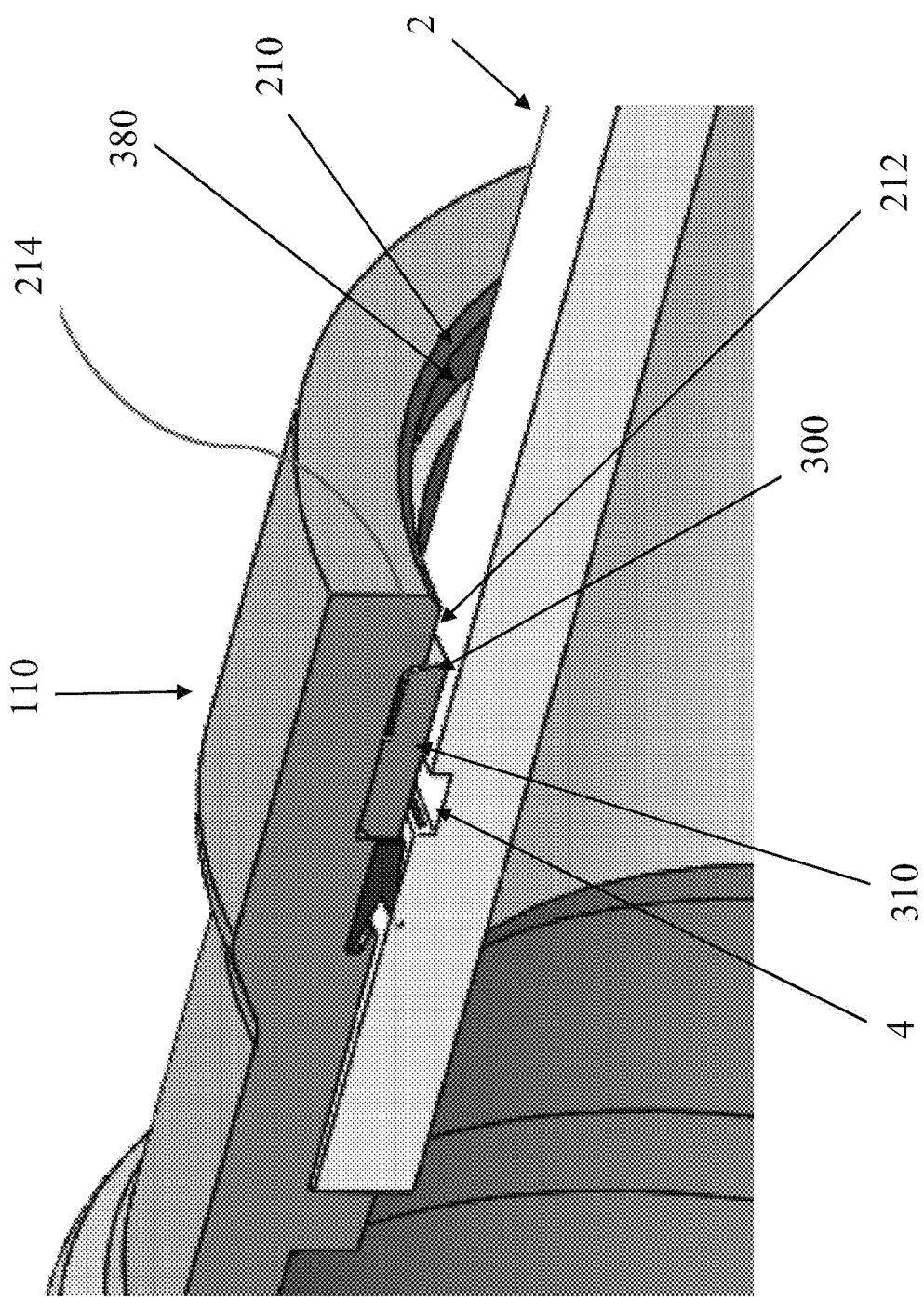
FIG. 12 is an enlarged detailed view of a cross-sectional perspective view of the connect/disconnect fitting connection in accordance with a second embodiment of the present invention, with a retaining ring assembly comprising a grip ring.

The releasable connect/disconnect connection 110 shown in FIG. 12 comprises a retaining ring assembly, shown generally by reference numeral 300, which in a preferred embodiment comprises a grip ring 310. The retaining ring assembly 300 has a plurality of axially extending inwardly angled resilient retaining tabs, shown generally by reference numeral 312 in FIG. 13a. Each of the axially extending inwardly angled resilient retaining tabs 312 preferably comprise a pipe retaining portion, shown generally by reference number 314. Each of the pipe retaining portions 314 is operationally sized to engage an indentation, shown generally by reference numeral 4, on the pipe 2 when the pipe 2 is in an inserted position in the pipe opening, shown generally by reference numeral 210 in FIG. 12. In general, longitudinally inserting the pipe 2 into the pipe opening 210 axially past the retaining ring assembly 310 causes the pipe 2 to move the axially extending inwardly angled resilient retaining tabs 312 initially resiliently radially outwardly to permit insertion of pipe 2 to the inserted position and then resiliently radially inwardly into the groove 4 to the first locked position.

FIG. 14 shows an enlarged view of the pipe 2 axially received in the pipe opening 210 to the inserted position and one of the axially extending inwardly angled resilient retaining tabs 312 having moved to the first locked position with the pipe retaining portion 314 engaging the indentation, in this embodiment the groove 4, on the pipe 2. In the inserted position, each of the axially extending inwardly angled resilient retaining tabs 312 would be in the first locked position similar to the tab 312 shown in FIG. 14, with the pipe engaging portion 314 of each of the tabs 312 engaging the groove 4 of the pipe 2. In this first locked position, axial removal of the pipe 2 from the pipe opening 210 is restricted by the tabs 312 of the grip ring assembly 300, and, in particular, the pipe engaging portions 314 engaging the groove 4. This permits the retaining ring assembly 300 to retain the pipe 2 in the inserted position.

For removal of the pipe 2, relative movement of the axially extending inwardly angled resilient retaining tabs 312 of the retaining ring assembly 300 with respect to the pipe 2 from the first locked position (shown in FIG. 14) to a second unlocked position causes the pipe retaining portions 314 of the axially extending inwardly angled resilient retaining tabs 312 to disengage from the indentation 4 in the pipe 2 thereby permitting removal of the pipe 2 from the inserted position in the fitting body 10. Preferably, a removal tool 280 is used to move the tabs 312 from the first locked position to the second unlocked position.

The grip ring 310 preferably has a plurality of angled blades 313 defining the plurality of axially extending inwardly angled resilient retaining tabs 312 of the retaining ring assembly 300. In one preferred embodiment, the retaining ring assembly 300 comprises solely the grip ring 310. The grip ring 310 is preferably formed with relative radially outward flexure to permit the grip ring 310 to radially outwardly expand. In this preferred embodiment, the pipe opening 210 has an internal groove 214 located on an internal sidewall 212, as shown for instance in FIG. 14. The internal groove 214 is sized for receiving the retaining ring assembly 300, which in this embodiment comprises solely the grip ring 310 such that the grip ring 310 is substantially contained within the fitting body 10 so as not to extend beyond the pipe opening 210 when the grip ring 310 has been inserted within the pipe opening 210. Furthermore, the relative outward flexure of the grip ring 310 causes the grip ring 310 to radially expand into the internal groove 214 of the pipe opening 210 as shown, for instance, in FIG. 12, such that the relative outward flexure of the grip ring 310 maintains the ring 310 within the internal groove 214.

Figure 13A:
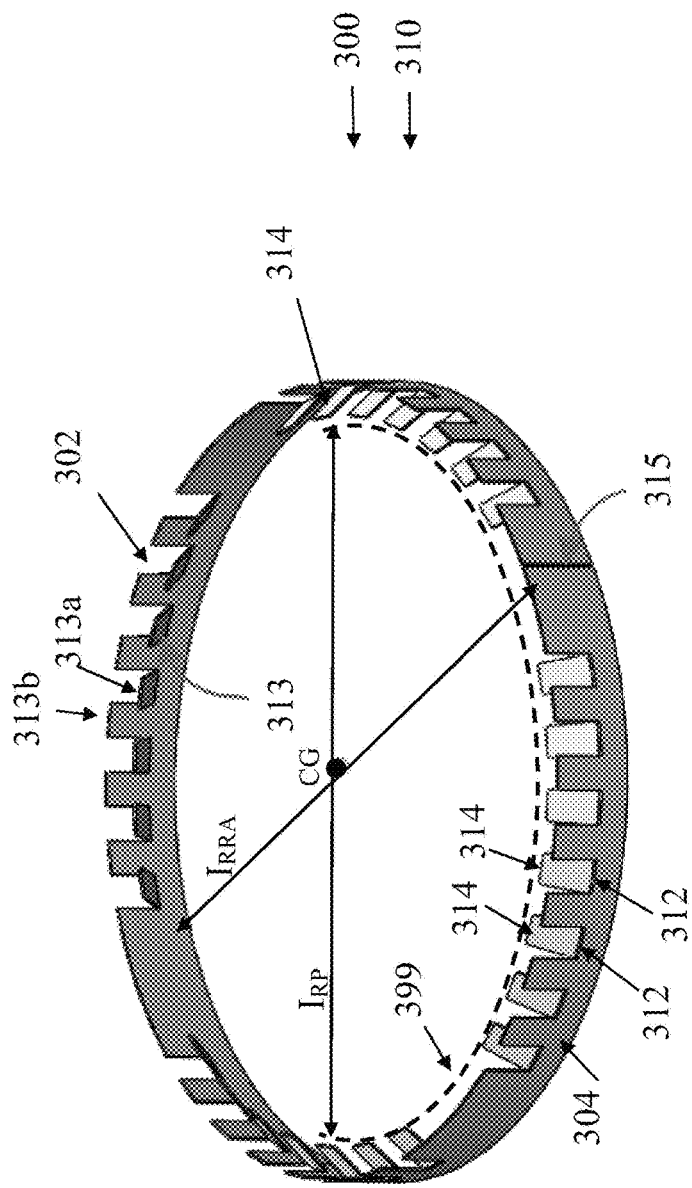
FIG. 13a is a perspective view of the grip ring shown in FIG. 12.
Figure 13B:
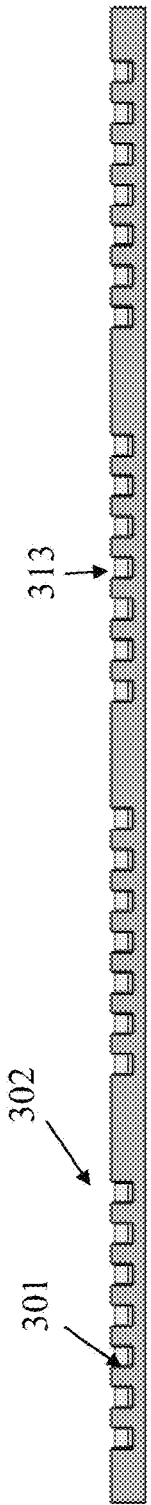
FIG. 13b illustrates a top plan view of a strip of metal used to form the grip ring according to one preferred embodiment.
Figure 13C:
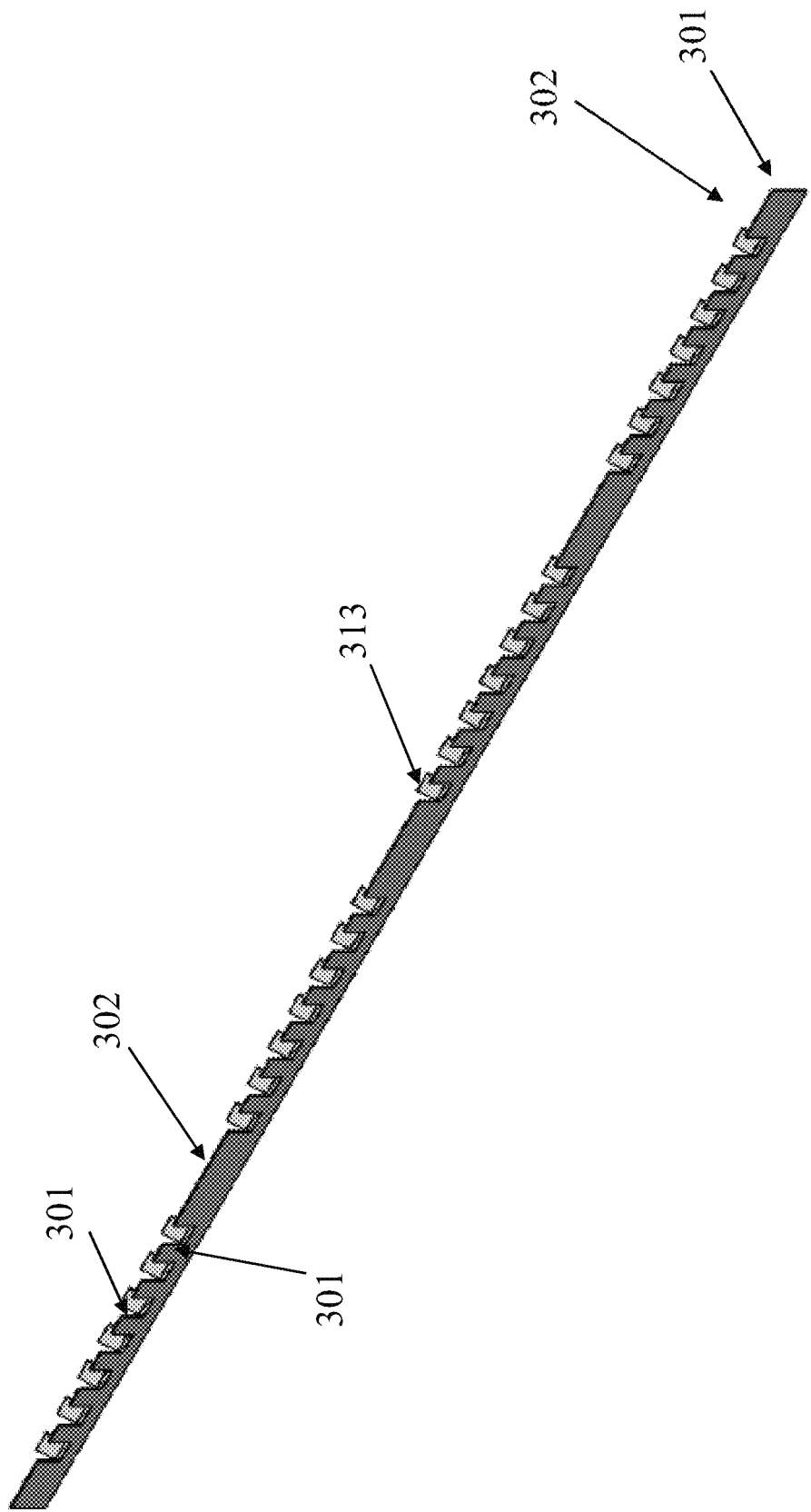
FIG. 13c is a perspective view thereof.

Preferably, the grip ring 310 is substantially metallic and is made from a single strip of metal 301 as shown, for instance, in FIGS. 13b and 13c. This strip of metal 301 preferably has a plurality of incomplete perpendicular cuts 303 along a lateral side 302 forming the multitude of angled blades 313 oriented longitudinally along the strip of metal 301 and extending from the lateral side 302. In one preferred embodiment, the strip of metal 301 may be resiliently coiled to be radially outwardly biased, thereby producing the relative radial outward flexure of the grip ring 310 so that the grip ring 310 may radially expand into the internal groove 214 located on the internal sidewall 212 of the pipe opening 210. In this way, the grip ring 310 may be substantially contained within the pipe opening 210 and also provide a space 380, as shown in FIG. 12, between the outer surface of the pipe 2 and the inner surface of the internal sidewall 212 of the pipe opening 210 sufficient to receive a removal tool 280 therebetween Preferably, as shown in FIG. 13a, one subset 313a of the multitude of blades 313 have been angled toward a center $C_G$ of the grip ring 310 to define the plurality of axially extending inwardly angled resilient retaining tabs 312 of the retaining ring assembly 300 when the strip of metal 301 is coiled to be radially outwardly biased and inserted in the internal groove 214. Another subset 313b of the blades 313 is optionally not angled toward the center $C_G$ of the grip ring 310 to facilitate retaining the grip ring 310 in the internal groove 214. The subset 313b of optionally non-angled blades are shown as projecting axially forward to facilitate fixing the grip ring 310 in the internal groove 214 in this embodiment. However, it is understood that other types of projections or shapes of the optionally non-angled subset 313b of blades are also possible for this purpose. Furthermore, the portion of the grip ring 310 from which the axially extending inwardly angled resilient retaining tabs 312 extend constitutes a main body 304 of the assembly 300 and is preferably annularly shaped.

Accordingly, in this preferred embodiment, the axially extending inwardly angled resilient retaining tabs 312 are preferably substantially identical. Moreover, the corresponding pipe retaining portions 314 have an equal length and are angled in the same manner towards the center $C_G$ of the grip ring 310. In this way, the arrangement of the pipe retaining portions 310 define a perimeter of an engagement circle (shown generally in part by dashed lines in FIG. 13a for ease of illustration and identified by reference numeral 399), having an inner diameter $I_{RP}$ which is less than the outer diameter $O_{DP}$ of the pipe 2. In this way, when the axially extending inwardly angled resilient retaining tabs 312 are resiliently inwardly deformed into the external groove 4, the pipe retaining portions 314 engage the pipe 2, and more specifically the inner wall 5 of the groove 4, to retain the pipe 2 in the inserted position. Furthermore, the main body 304 of the retaining ring assembly 300 has an inner diameter $I_{RRA}$ which is greater than the outer diameter $O_{DP}$ of a pipe to facilitate insertion of the pipe 2, as well as the removal tool 280, axially into the pipe opening 210 past the retaining ring assembly 300.

Furthermore, FIG. 13a shows a slit, identified by reference number 315, which results solely for ease of manufacture as a result of the strip of metal 301 being resiliently coiled to be radially outwardly biased to produce the relative radial outward flexure of the grip ring 310. As discussed above, the relative radial outward flexure of the grip ring 310 permits the grip ring 310 to radially expand into the internal groove 214 located on the internal sidewall 212 of the pipe opening 210 with the grip ring 310 substantially contained within the pipe opening 210.

This arrangement, with the retaining ring assembly 300 comprising solely the grip ring 310, provides sufficient pressure withholding capacity for many common plumbing applications. However, in some cases, additional or improved pressure withholding capacity may be required.

Figure 15:
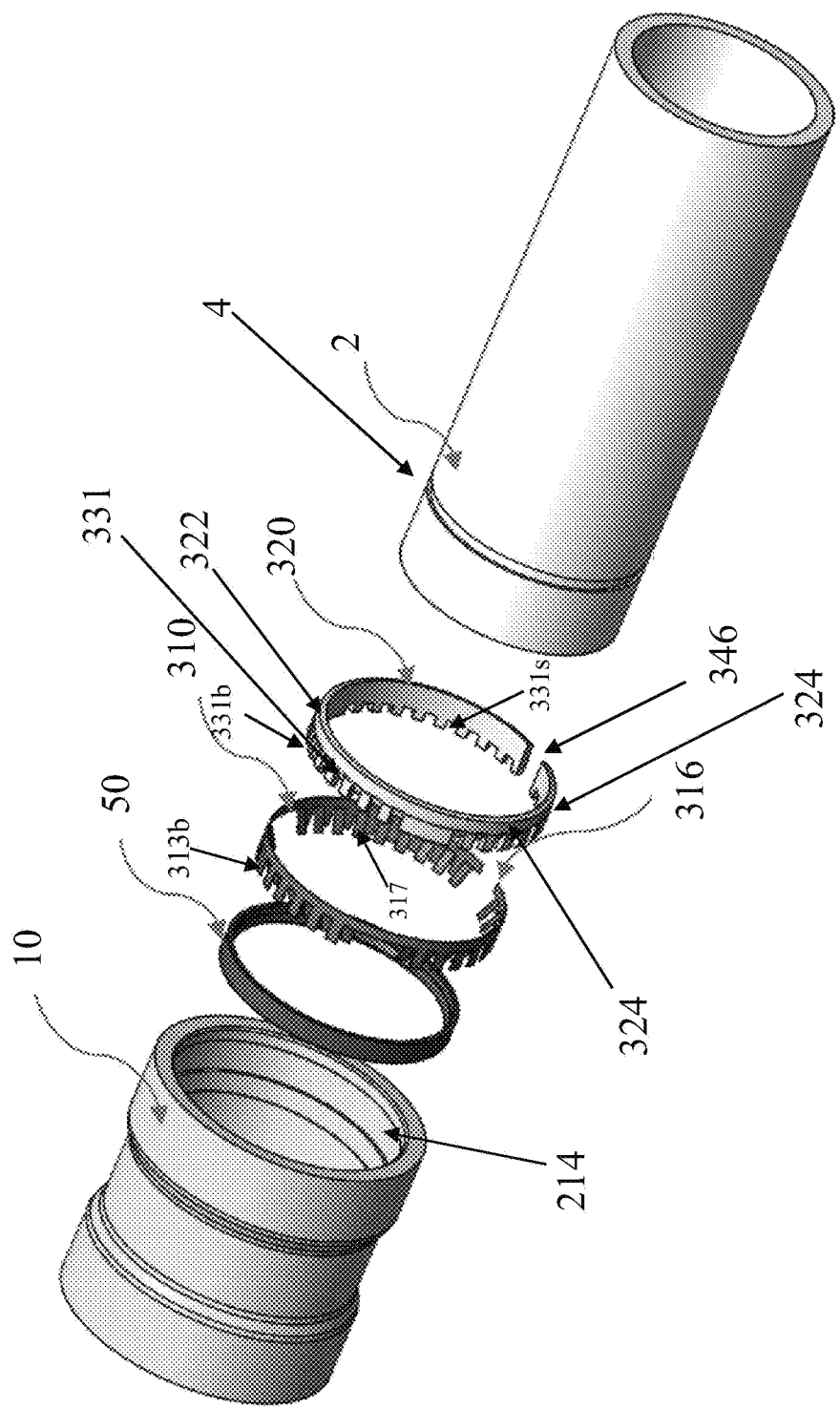
FIG. 15 is an exploded view of the connect/disconnect fitting connection in accordance with the second embodiment of the present invention illustrating the retainer ring assembly according to one preferred embodiment comprising a metal grip ring and a retainer clip.
Figure 16:
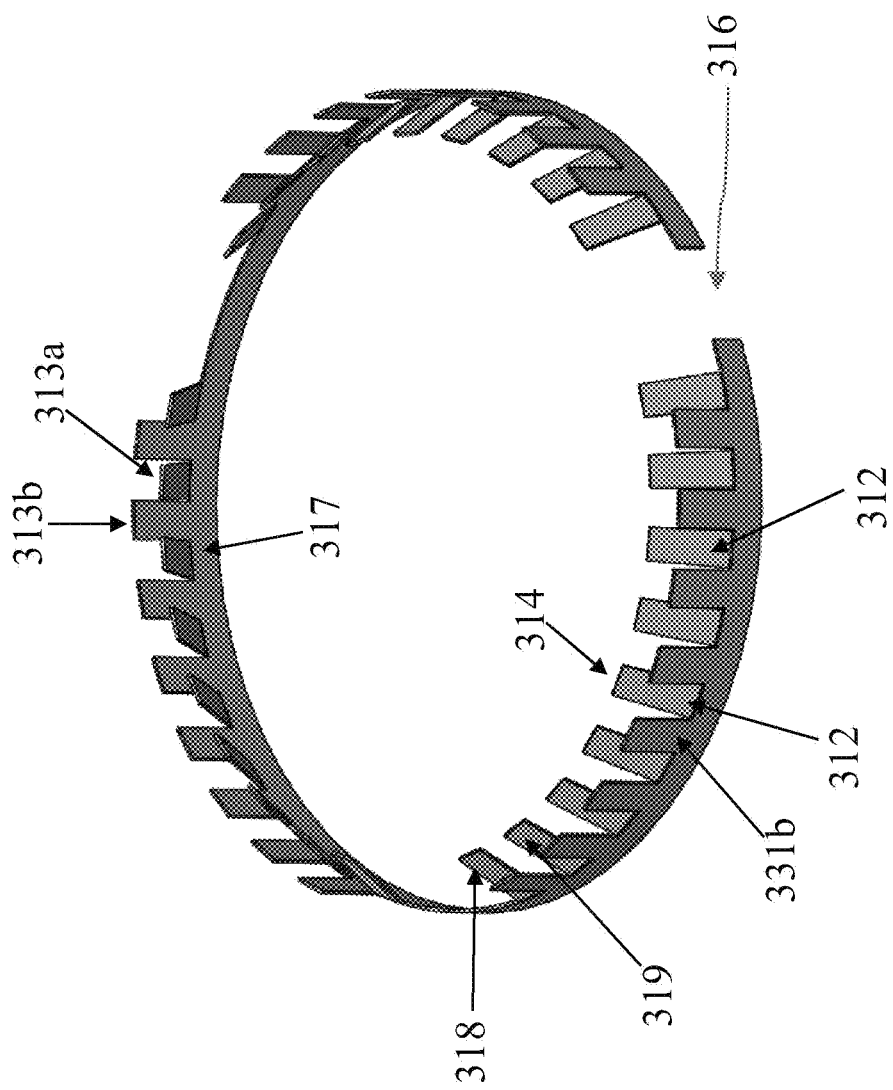
FIG. 16 is a perspective view of the grip ring shown in FIG. 15 for use with a retainer clip in accordance with the second embodiment of the present invention where the retaining ring assembly comprises a grip ring and a retainer clip.
Figure 17:
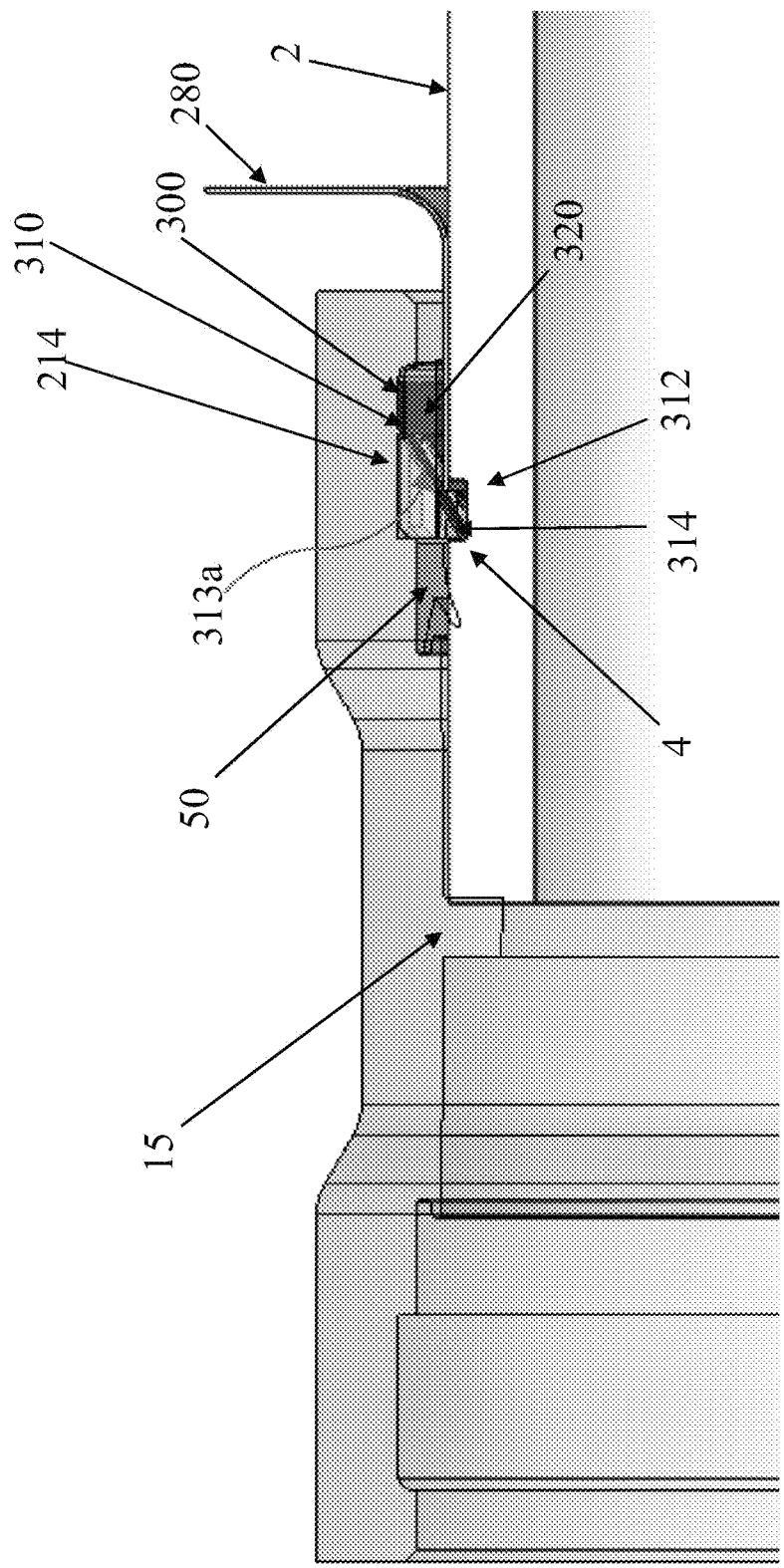
FIG. 17 is a cross-sectional view of the connect/disconnect fitting connection as shown in FIG. 15 with the pipe in the inserted position and a pipe removal tool about to engage the axially extending inwardly angled resilient retaining tabs of the retaining ring assembly according to one preferred embodiment of the present invention.
Figure 18:
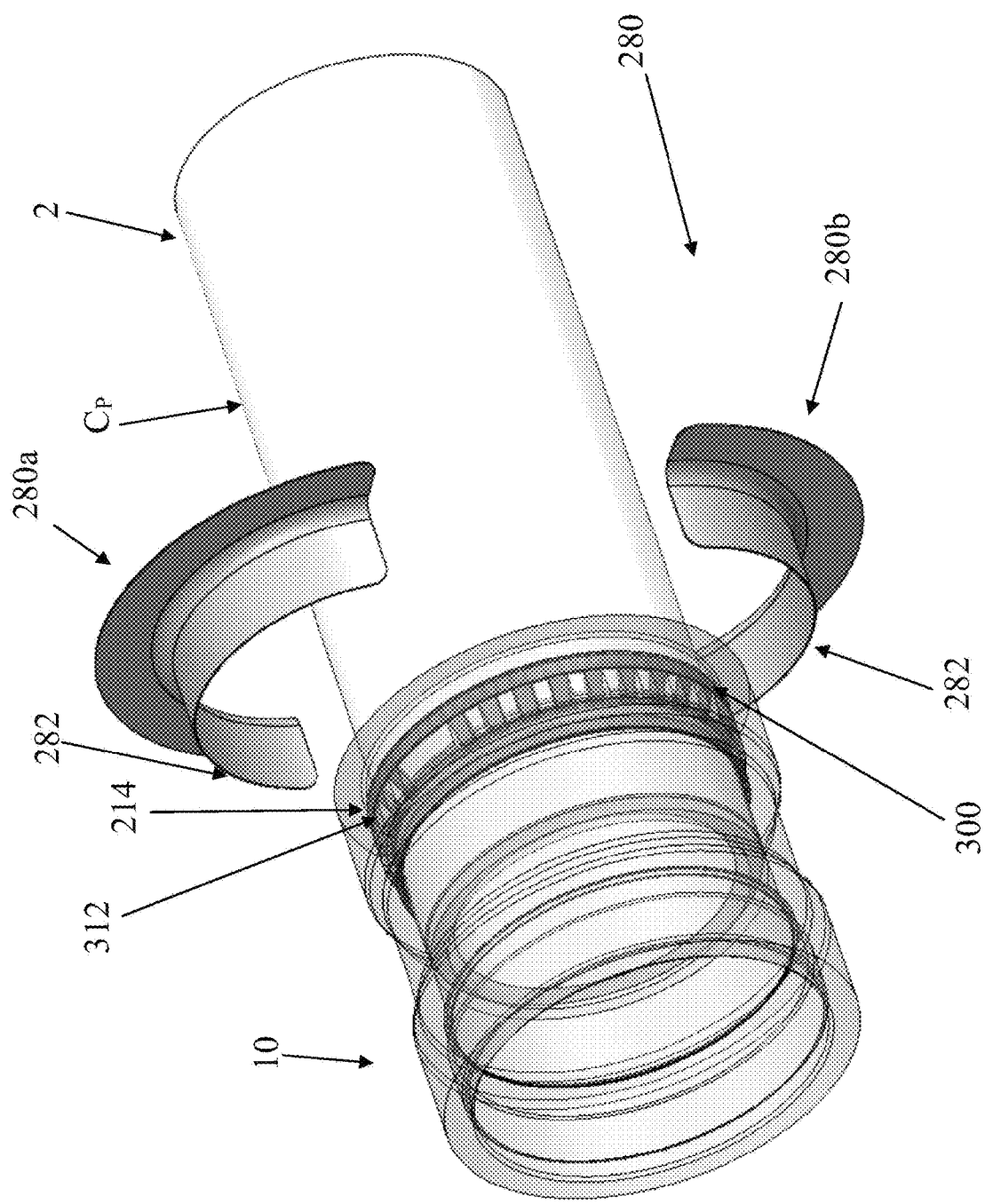
FIG. 18 is a perspective view of the connection as shown in FIG. 17 but with the fitting body shown as transparent to illustrate the retaining ring assembly fixed to an internal sidewall of the pipe opening, and, the two parts of the removal tool about to encompass and outer perimeter of the pipe.

In a further preferred embodiment, the retaining ring assembly 300 may further comprise a retainer clip, shown generally by reference numeral 320 in FIGS. 15, 17 and 18. The retaining clip 320 has a grip ring engagement surface 331 which mates with a corresponding retainer engagement surface 317 of the grip ring 310 (shown in FIG. 16) to retain the grip ring 310 therewithin. The retaining clip 320 also comprises a fitting body engagement portion 322 for engaging the internal sidewall 212 of the pipe opening 210.

In one preferred embodiment, the fitting body engagement portion 322 of the retaining clip 320 comprises a pipe groove engagement surface 324 (shown in FIG. 15) for engaging the internal groove 214 of the pipe opening 210. In this preferred embodiment, the internal groove 214 is sized for receiving the retaining ring assembly 300, which in this embodiment comprises the retainer clip 320 and the grip ring 310, and fixes the assembly 300 to the inner sidewalls 212 of the pipe opening 210 at the internal groove 214. In this way, the axially extending inwardly angled resilient retaining tabs 312 are angled radially inwardly towards the center CG of the grip ring 310 and are initially resiliently radially outwardly deformed by insertion of the pipe 2, and, then resiliently inwardly deformed into the external groove 4 so that the pipe retaining portions 314 engage the indentation on the pipe 2 to retain the pipe 2 in the inserted position. Also, the retainer clip 320 is sized to better fix and maintain the retaining ring assembly 300 within the internal groove 214. This increases the relative strength of the connection 110 as compared to the embodiment where the retaining ring assembly 300 comprises solely the grip ring 310, as shown in FIG. 12.

In this embodiment, the retaining ring assembly 300 is completely contained in the fitting body 10. This prevents the retaining ring assembly 300, and also the tabs 312, from being tampered with or inadvertently removed from the fitting body 10. This also prevents the axially extending inwardly angled resilient retaining tabs 312 from being inadvertently moved to the second unlocked position causing an unwanted release of the pipe 2 from the inserted position.

As shown in FIGS. 16, 17 and 18, the grip ring 310 in this embodiment is substantially similar to the grip ring 310 shown in FIG. 13 except that the grip ring 310 in this embodiment has a grip ring radial cut-out 316 which corresponds to the retainer clip radial cut-out 346. This permits the assembly 300, including the grip ring 310 retained within the retainer clip 320, to be resiliently constricted to a smaller size so as to be received within the pipe opening 210 and then resiliently radially expanded outwardly into the internal groove 214. The internal groove 214 is sized to receive the retainer ring assembly 300, and, to engage with the pipe groove engagement surface 324 of the retainer clip 320. In this way, the assembly 300, comprising a retainer clip 320 retaining a grip ring 310, may provide a greater load bearing against potential pull-out forces induced, for example, by a pressurized pipe than the assembly 300 comprising solely the grip ring 310. In other words, adding a retainer clip 320 to the retaining ring assembly 300 may improve the load bearing characteristics of the retaining ring assembly 300, as compared to the retaining ring assembly 300 comprising solely a grip ring 310.

As indicated above, in a preferred embodiment, the grip ring 310 is made of metal and, in particular, a strip of metal 301. In other words, the grip ring 310 shown in FIGS. 13a and 16 could be formed from the same type of strip of metal 301 shown in FIGS. 13b and 13c. Comparing FIGS. 13a and 16, the grip ring 310 is substantially the same in both cases except that the slit 315 shown in FIG. 13a is replaced by a cut-out 316. It is understood that the grip ring slit 315 in FIG. 13a could also be replaced with the grip ring radial cut-out 316 such that the grip ring 310 shown in FIG. 16 could also operate on its own and without the retaining clip 320 with the cut-out 316 producing the relative outward flexure so that the grip ring 310 may radially expand into the internal groove 214.

The retainer clip 320 could also be made from metal. Alternatively, the retainer clip 320 could be made from other materials, including plastic. In either case, the operation of the cut-outs 316 and 346 would provide sufficient resilient flexure in the resulting retaining ring assembly 300 at a point opposite to the location of the cut-outs 316, 346, to permit resiliently constricting of the assembly 300 so that the assembly 300 may be received into the opening 210 and then permitted to resiliently radially outwardly expand into the internal groove 214.

Preferably, when the assembly 300 is received in the pipe opening 210, the retainer clip 320 and grip ring 310 expand into the internal groove 214 and the pipe groove engagement surface 324 mates with the internal groove 214 to fix the retaining ring assembly 300 to the internal groove 214 and to the internal sidewall 212 of the pipe opening 210 with the retaining ring assembly 300 located within or flush with the pipe opening 210 of the pipe fitting 10 and within the fitting body 10.

As shown in FIGS. 15 and 16, the engagement surface 317 of the grip ring 310 may comprise the inner surface of the non-angled subset of blades 313b which preferably mate with corresponding projections 331b of the grip ring engagement surface 331 of the retainer clip 320. During assembly, the non-angled subset of blades 313b are preferably radially aligned with the corresponding projections 331b of the grip ring engagement surface 331 to ensure proper mating. In this way, the non-angled subset of blades 313b and the projections 331b engage the internal groove 214 to resist axial movement of the retaining ring assembly 300 as well as the pipe 2 which is engaged by the pipe retaining portions 314. Furthermore, in this embodiment, the angled blades 313a pass through corresponding slots 313s in the retaining clip 320 formed in between the projections 331b. This further facilitates interlocking of the grip ring 310 and the clip ring 320 to retain the grip ring 10 with the retaining ring 320 and fix the assembly 300 to an inner sidewall 212 of the pipe opening 210.

Figure 19:
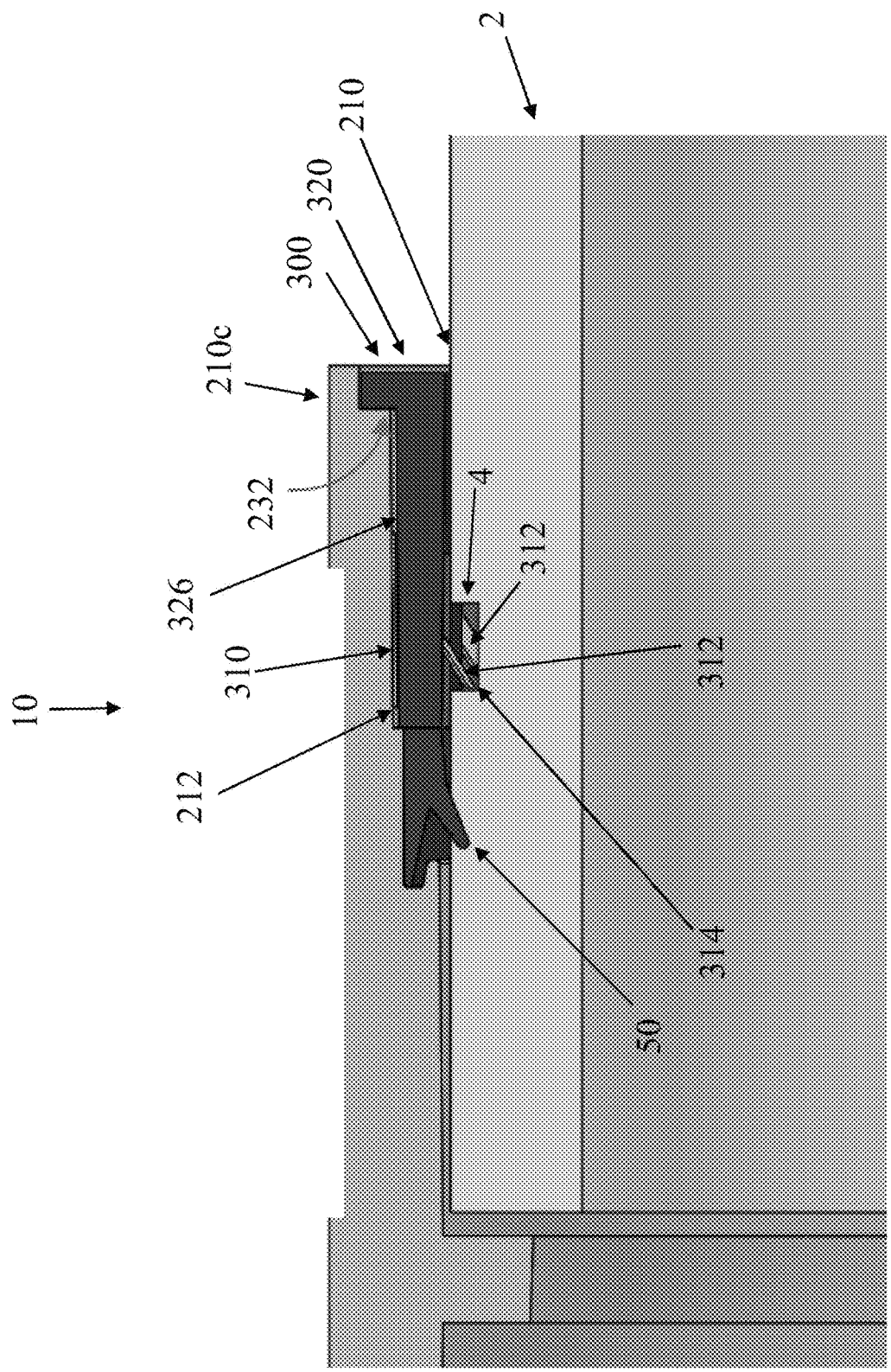
FIG. 19 is a cross-sectional view of the connect/disconnect fitting connection in accordance with the second embodiment of the present invention illustrating the retaining ring assembly according to one preferred embodiment comprising a pipe opening permanent bonding surface permitting a permanent bond to be formed between the fitting body and the retainer clip of the retaining grip assembly.
Figure 20:
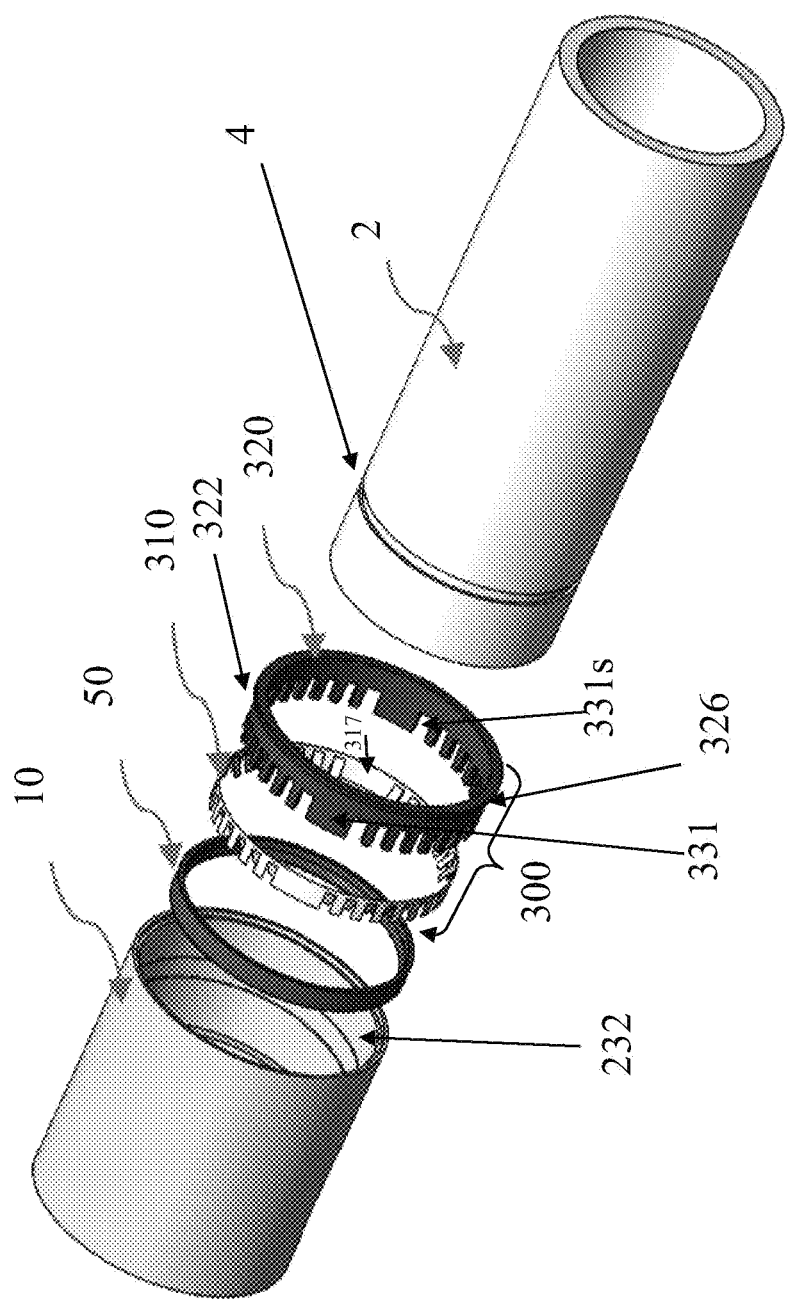
FIG. 20 is an exploded view of the connect/disconnect fitting connection shown in FIG. 19.

In an alternate preferred embodiment, the fitting body engagement portion 322 of the retaining clip 320 comprises a pipe opening permanent bonding surface 326 which mates with a corresponding retainer clip bonding surface 232 on the internal sidewall 212 of the pipe opening 210, as illustrated, for instance, in FIGS. 19 and 20. This permits a permanent bond to be formed between the retainer clip 320 of the retaining ring assembly 300 and the fitting body 10, and more specifically the pipe opening 210. Such a permanent bond could be formed, for example, by ultrasonic or spin welding. Typically, the plurality of axially extending inwardly angled resilient retaining tabs 312 are angled radially inwardly with the pipe retaining portions 314 directed axially forward into the pipe opening 210 for engaging the indentation 4 in the pipe 2 when the pipe 2 is in the inserted position. Furthermore, the retaining ring assembly 300 is fixed in this embodiment by permanently bonding the pipe opening bonding surface 232 to the retainer clip bonding surface 232 on the inner sidewall 212 of the pipe opening 210 with the retaining ring assembly 300 located within or flush with the pipe opening 210 of the fitting body 10. Also, the retainer clip 320, as well as the pipe opening permanent bonding surface 326 are sized to be fixed and maintained within the fitting body 10. As shown in FIG. 19, for example, the opening 210 has a cantilever portion 210c which extends over the retaining ring assembly 300 and the pipe opening permanent bonding surface 326 so that the retaining ring assembly 300 is located within or flush with the pipe opening 210 of the fitting body 10. As is also apparent from a review of the FIGS. 12 to 20, the second embodiment comprises a gasket 50 similar to the first embodiment. In particular, gasket 50 is located axially between an insertion end 9 of the pipe 2 and the retaining ring assembly 300 when the pipe 2 is in the inserted position and the axially extending inwardly angled resilient tabs 312 are in the first locked position. In this way, the gasket 50 fluidly seals the fitting 10 in a similar manner in both embodiments.

Furthermore, in a preferred embodiment, the removal tool 280 comprises at least two parts, namely a first part 280a and a second part 280b, as shown for instance in FIG. 18. The two parts 280a. 280b, encompass an outer perimeter or circumference CP of the pipe 2, as shown for instance in FIG. 18. In this way, substantially simultaneous relative axial movement of the first part 280a and the second part 280b of the removal 280 between the pipe 2 and the retaining ring assembly 300 from the pipe opening 210 and through the space 380, as shown for instance in FIG. 18, and between the retainer clip 320 of the retaining ring assembly 300 and the pipe 2 axially past indentation 4 in the pipe 2, causes the removal tool 280 to engage the axially extending inwardly angled resilient retaining tabs 312 of the retaining ring assembly 300. In this way, the removal tool 280 moves the tabs 312 from the first locked position to the second unlocked position permitting removal of the pipe 2 from the inserted position in the pipe opening 210. For east of illustration, this feature of the removal tool 280 is illustrated in FIG. 18 with respect to the embodiment of the retaining ring assembly 300 shown in FIGS. 16, 17 and 18, but, it is understood that a similar operation of the removal tool 280 would apply to the embodiment shown in FIGS. 19 to 20 as well as the embodiment shown in FIGS. 12 to 15.

The operation of this embodiment of the invention will now be described and illustrated with respect to FIGS. 21 to 31. For ease of illustration, the invention will be illustrated with respect to the preferred embodiment of the retaining ring assembly 300 comprising a grip ring 310 and a retainer clip 320 and fixed within an internal groove 214 of the pipe opening 210 as illustrated for instance in FIGS. 16, 17 and 18. However, it is understood that a similar operation would also occur if the embodiments illustrated in FIGS. 12 to 15, where the retainer ring assembly 300 comprises solely the grip ring 310, as well as the embodiment illustrated in FIGS. 19 and 20, where the retainer ring assembly 300 comprises a pipe opening permanent bonding surface 326 to permanently bond the retaining ring assembly 300 to the retainer clip bonding surface 232 of the pipe opening 210, were used, or, any other embodiments which would be understood from these embodiments by a person skilled in the art including a combination of different features thereof.

Figure 21:
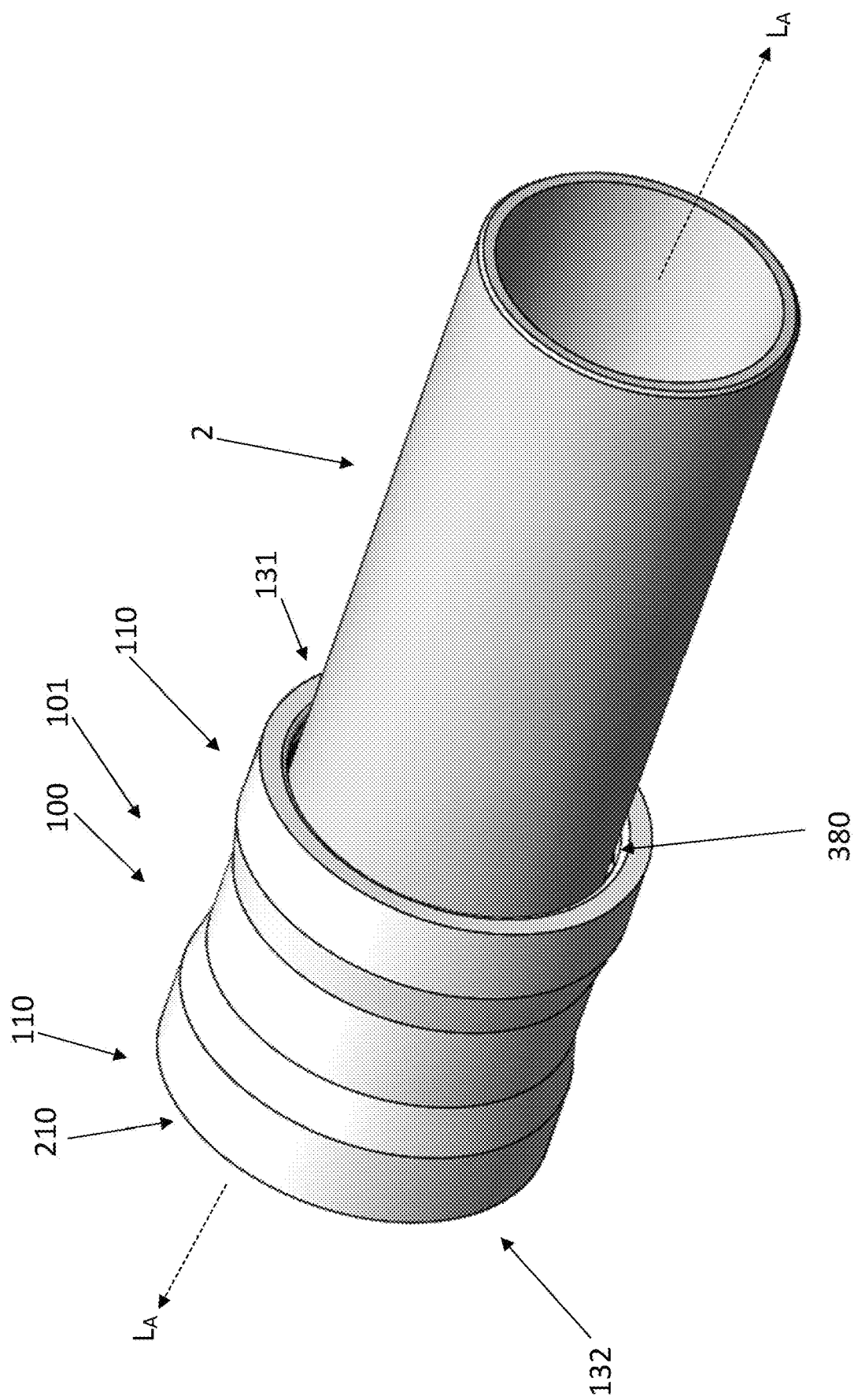
FIG. 21 is an external perspective view of the pipe coupling having a connect/disconnect fitting connection according to the second embodiment of the present invention with a pipe inserted at one end of the pipe coupling.

With reference now to FIG. 21, FIG. 21 shows the fitting 100 having a connection 110 according to the second embodiment of the present invention. The connection 110 may connect and disconnect a pipe, shown generally by reference numeral 2, to the fitting 100. As with the first embodiment shown in FIG. 1, the fitting 100 is shown as a pipe coupling 101 in FIG. 21, however, it is understood that the connection 110 could be used with any type of fitting, including, but not limited to, elbow fittings, tee fittings, wye fittings, pipe reducing fittings and pipe expanding fittings, P traps, S traps, end caps, as well as various types of flanges. The connection 110 shown in FIG. 21 is also mechanical, such that there are no solvents or other chemicals required similar to the first embodiment.

Furthermore, the pipe coupling 101 shown in FIG. 21 has a first end 131 and a second end 132 for coupling two pipes together. In FIG. 21, as with FIG. 1, the pipe coupling 101 has a connection 110 at both ends 131, 132. However, it is understood that it is not necessary that the pipe coupling 101 have a pipe connection 110 according to the present invention at both ends 131, 132, and only one of the ends 131, 132 may have a connection 110 according to the present invention including the second embodiment.

Figure 24:
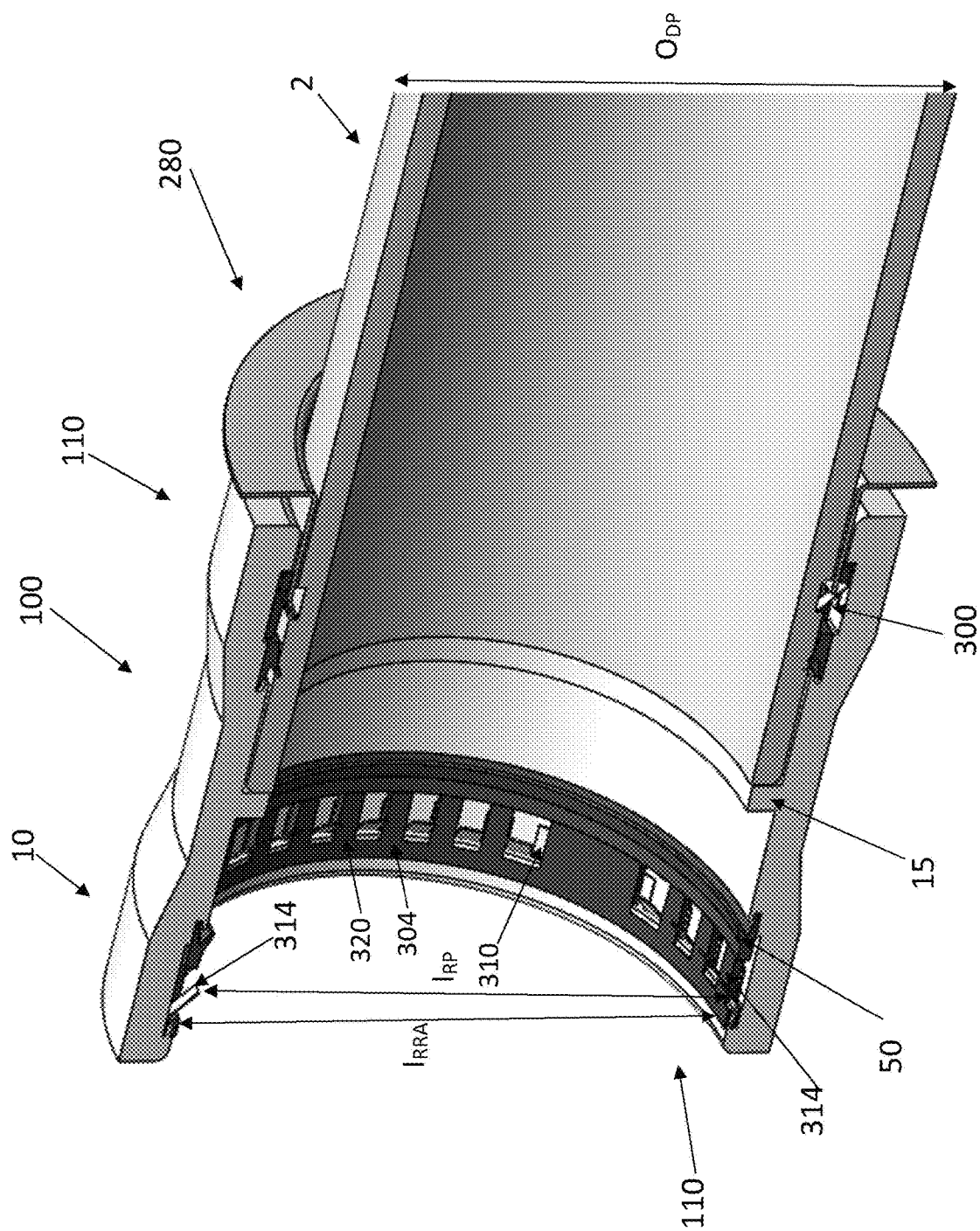
FIG. 24 is a cross-sectional view of the connect/disconnect fitting connection shown in FIG. 22 with the pipe in the inserted position and the pipe removal tool about to engage the retaining ring assembly according to one preferred embodiment of the present invention.
Figure 25:
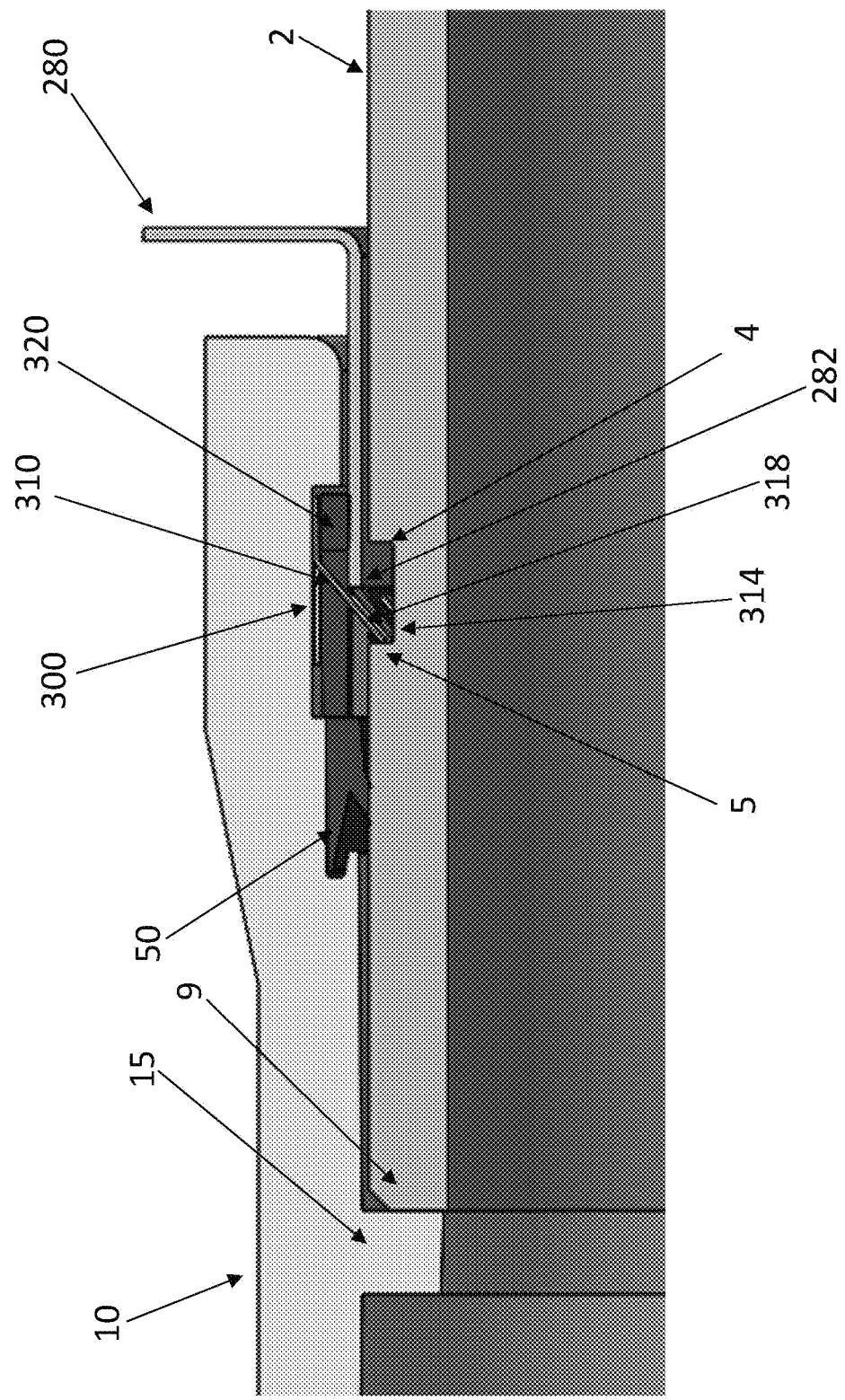
FIG. 25 is a cross-sectional view of the connect/disconnect fitting connection shown in FIG. 24 in more detail with the pipe in the inserted position and the pipe removal tool about to engage the axially extending inwardly angled resilient retaining tabs of the retaining ring assembly.
Figure 29:
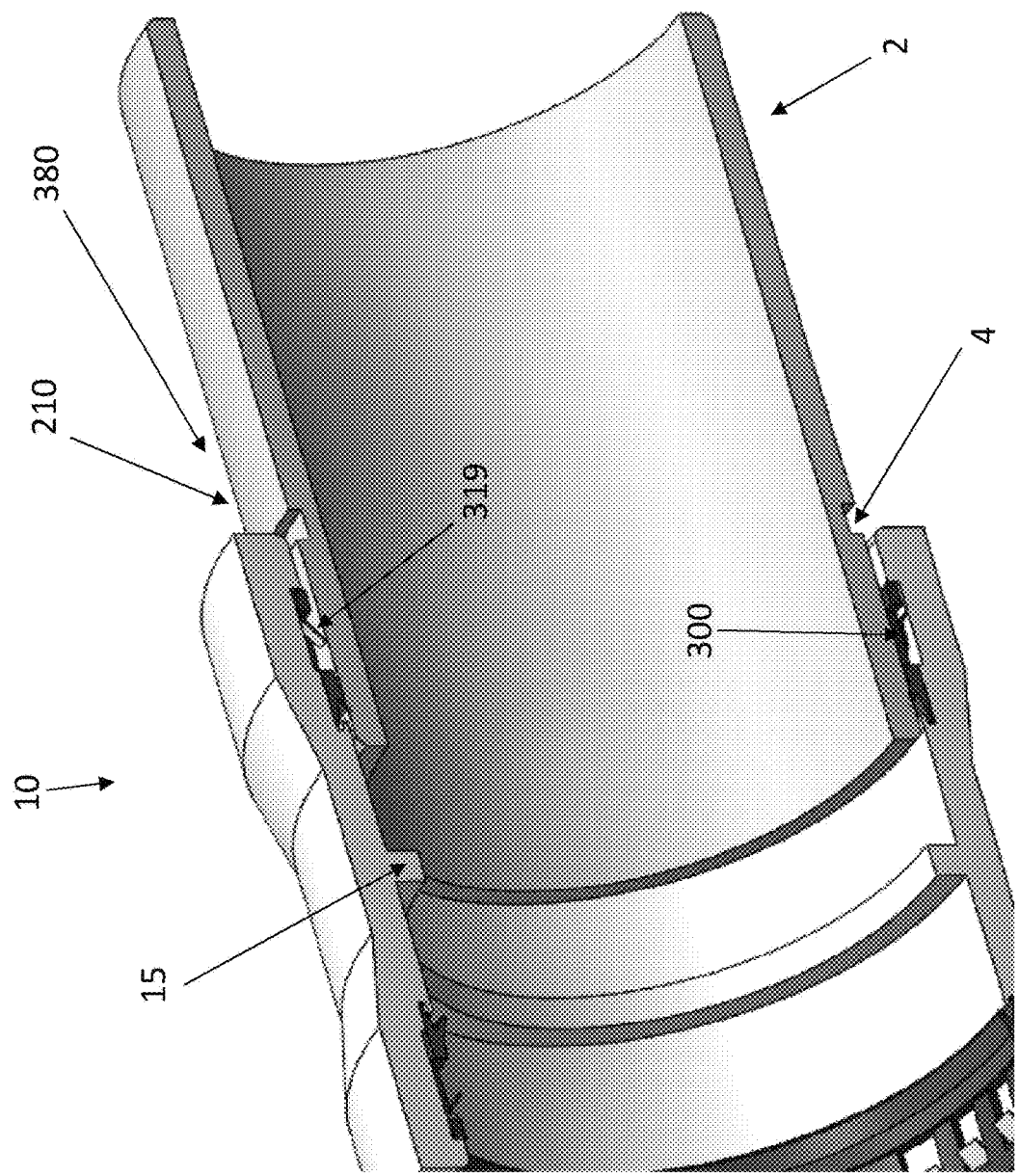
FIG. 29 is a cross-sectional perspective view of the connect/disconnect fitting connection shown in FIG. 22 with a pipe being inserted into the pipe connection with the pipe engaging the axially extending inwardly angled resilient retaining tabs to releasably connect the pipe to the pipe opening of the connect/disconnect fitting connection.
Figure 30:
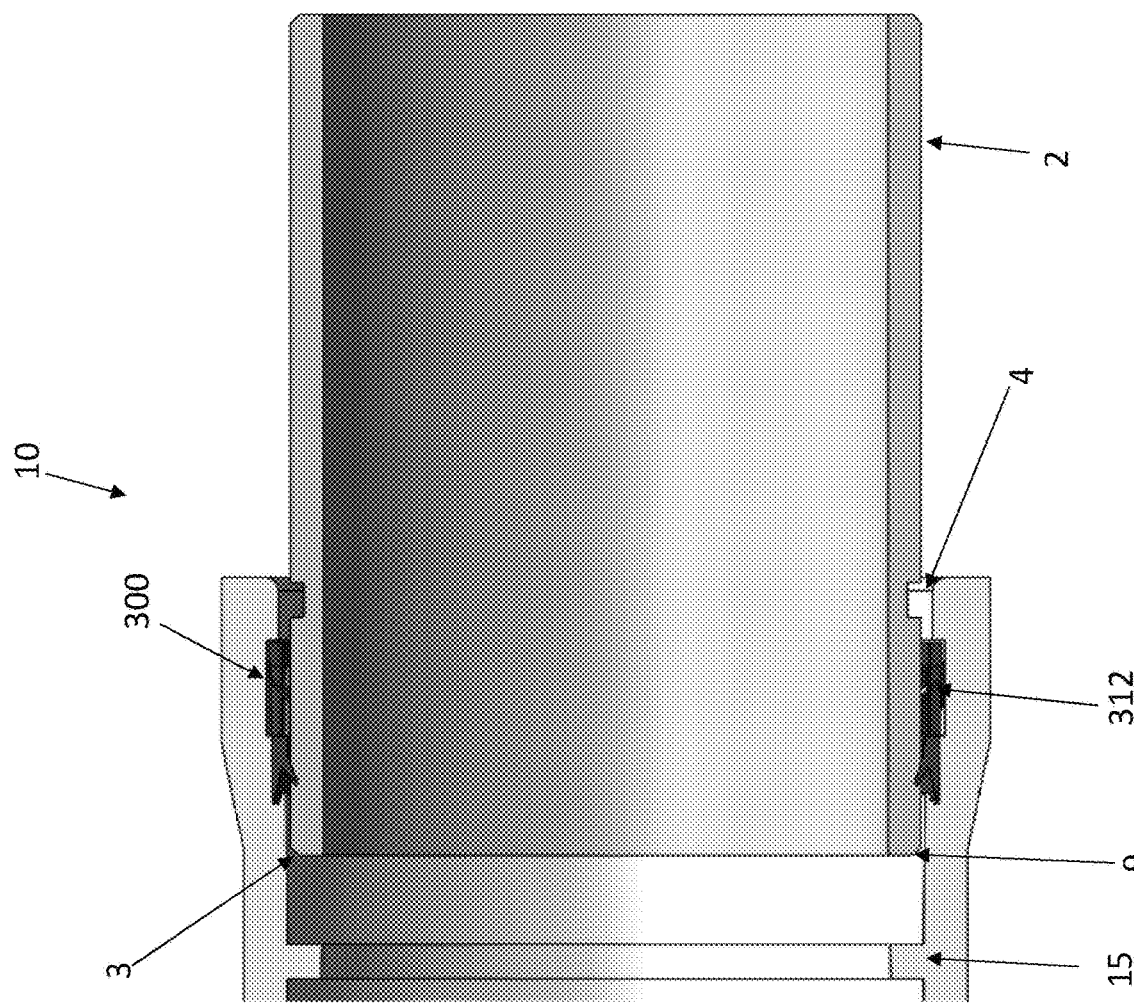
FIG. 30 is a cross-sectional view of the connect/disconnect fitting connection shown in FIG. 29 with a pipe being inserted into the pipe opening of the pipe connection to releasably connect the pipe to the connect/disconnect fitting connection.
Figure 31:
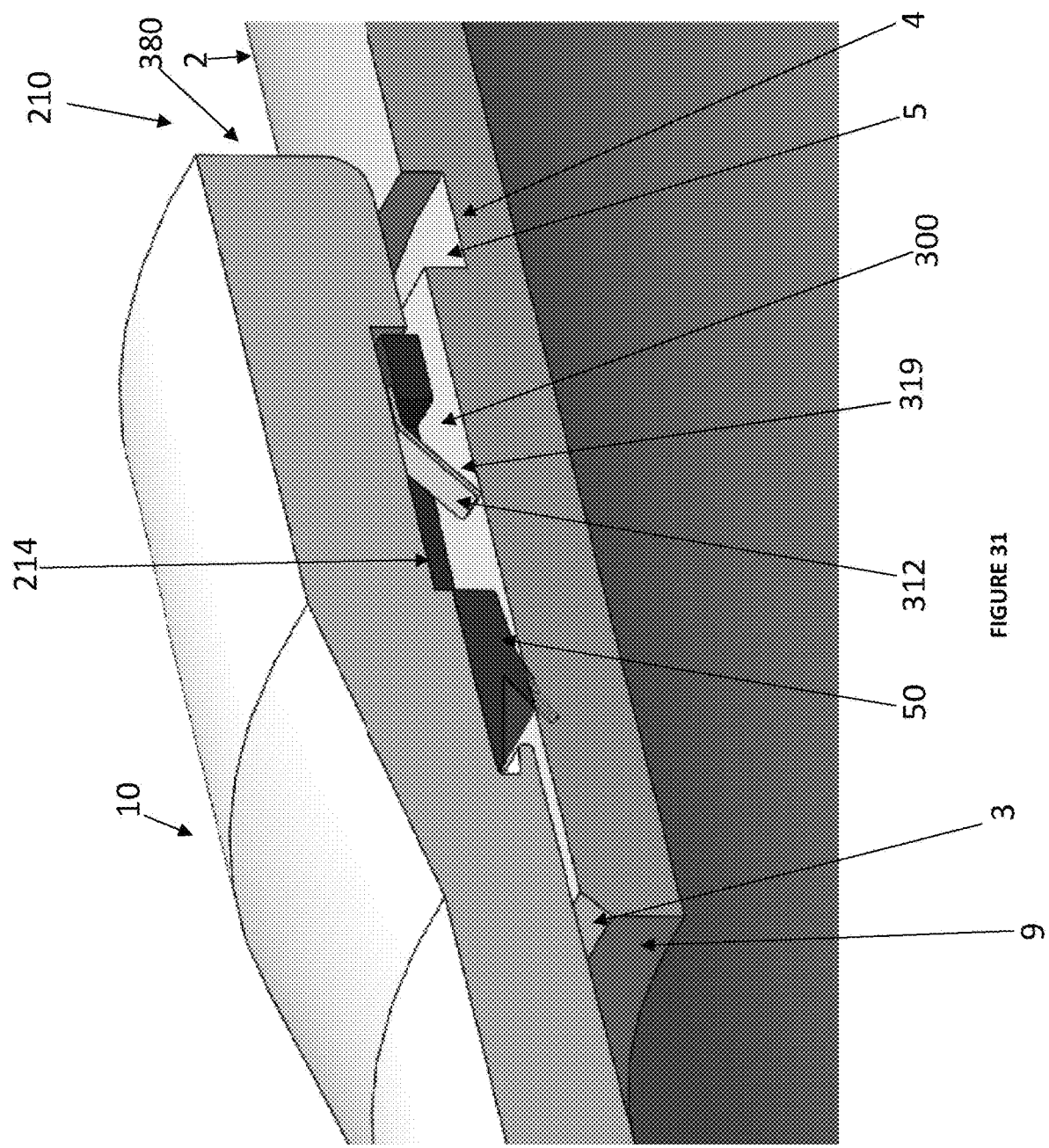
FIG. 31 is a detailed view of FIG. 29 with a pipe being inserted into the pipe opening of the pipe connection to releasably connect the pipe to the connect/disconnect fitting connection.

For ease of illustration, while both ends 131, 132 of the pipe coupling 101 illustrated in the figures have connections 110 pursuant to at least the second embodiment of the present invention, the pipe 2 is shown being inserted only into the second end 132 of the pipe coupling 101. The first end 131 of the pipe coupling 101 shows the pipe connection 110 without a pipe (not shown) inserted to assist in illustrating the pipe connection 110 according to this second embodiment, but it is understood that in use, a pipe (not shown) would be connected to the pipe connection 110 at the first end 131 also. Furthermore, as described in the brief description, FIGS. 21, 22 and 23 of the present invention illustrate the pipe 2 in the inserted position at the second end 132. FIGS. 24 and 25 illustrate the connection 110 according to the second embodiment with the pipe retaining portion 314 about to be disengaged from the indention 4 of the pipe 2 to permit removal of the pipe 2. FIGS. 26, 27, 28a and 28b illustrate the connection 110 disengaging from the pipe 2 to permit removal of the pipe 2. FIGS. 29, 30 and 31 illustrate the initial insertion of the pipe 2 into the second end 132 of the pipe coupling 101 according to this second embodiment prior to the connection 110 engaging and connecting to the pipe 2.

Figure 22:
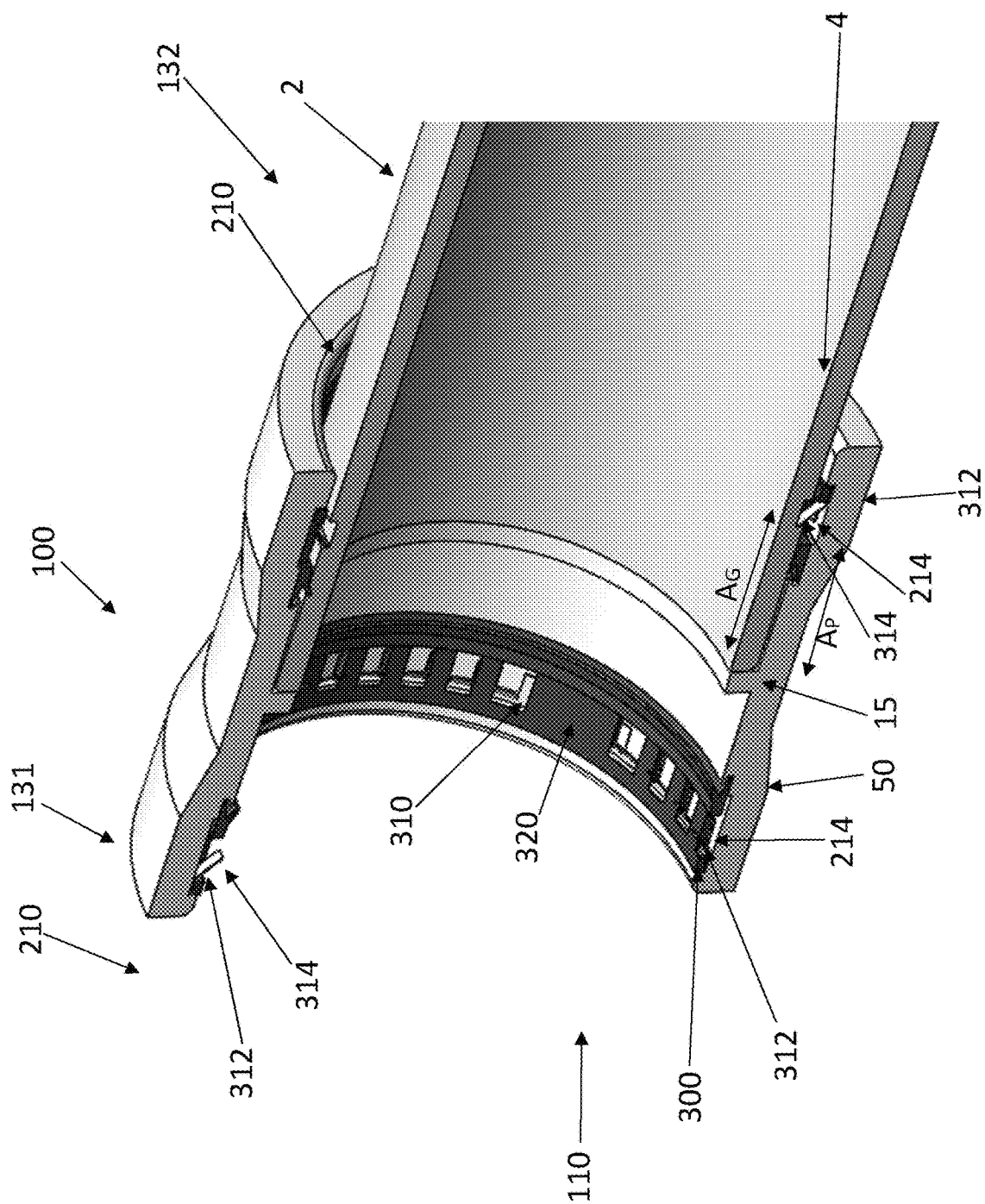
FIG. 22 is a cross-sectional perspective view of the pipe coupling shown in FIG. 21 with a connect/disconnect fitting connection according to the second embodiment of the present invention at both ends of the pipe coupling and a pipe in the inserted position at one end of the pipe coupling with the retaining ring assembly in the first locked position.
Figure 23:
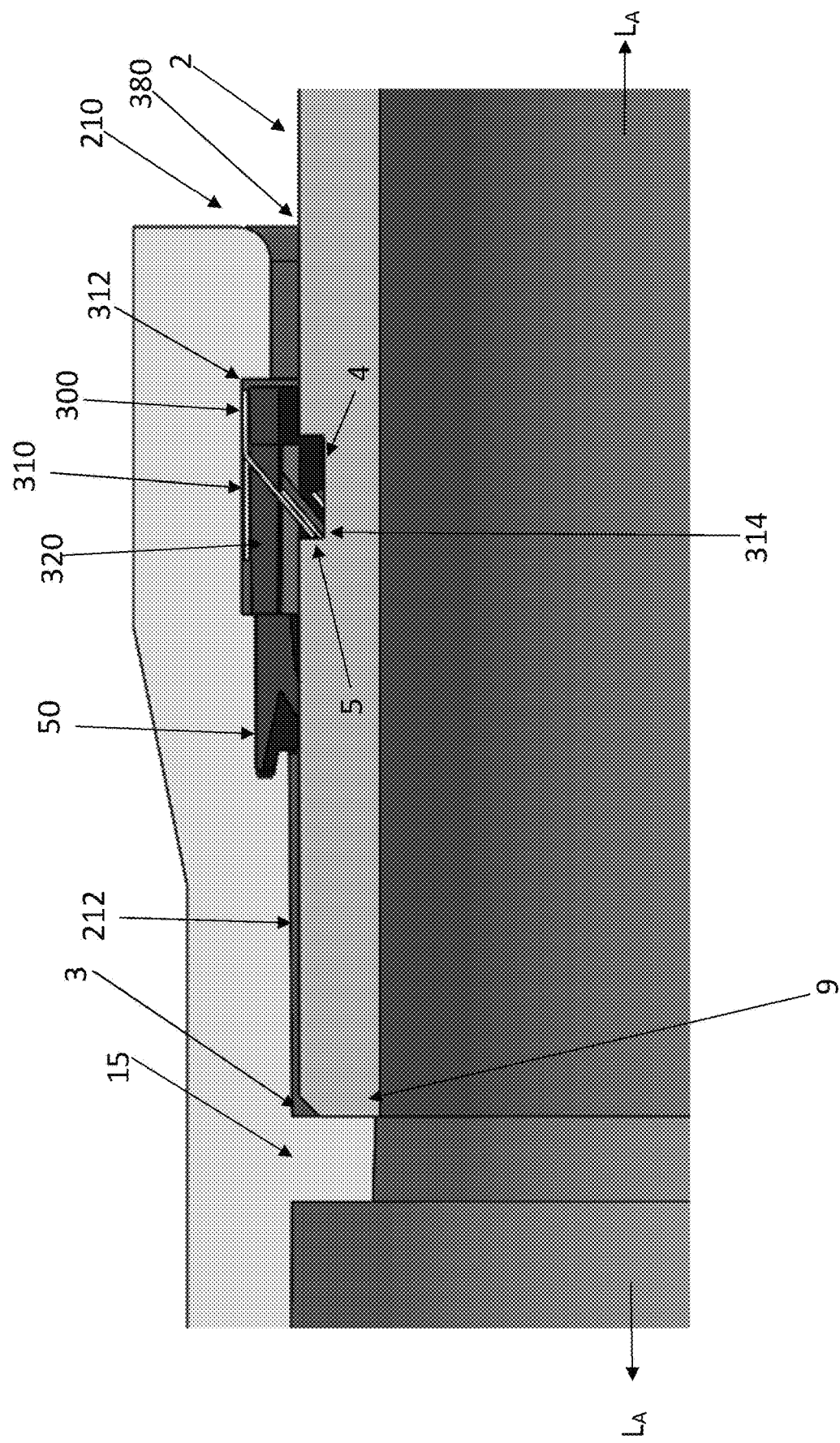
FIG. 23 is a cross-sectional view of the connect/disconnect fitting connection shown in FIG. 22 in more detail with the pipe in the inserted position and the retaining ring assembly in the first locked position.

As illustrated in FIGS. 21, 22 and 23, the connection 110, as described with respect to FIGS. 12 to 20, preferably comprises a fitting body 10 having or defining a pipe opening 210 of the fitting 100, namely the pipe coupling 101, for axially receiving the pipe 2 along a longitudinal axis, shown generally by the dash lines identified as $L_A$ in FIGS. 21 and 22.

In this embodiment, the connection 110 preferably comprises a retaining ring assembly 300. The retaining ring assembly 300 has a plurality of axially extending inwardly angled resilient retaining tabs 312 angled radially inwardly and extending axially into the pipe opening 210. As discussed above with respect to FIGS. 12 to 20, the retaining ring assembly 300 can be assembled in different manners. FIGS. 21 to 31 illustrate the embodiment where the retaining ring assembly 300 comprises a grip ring 310 and a retainer clip 320 as also illustrated in FIGS. 15 to 18 above.

FIGS. 21, 22 and 23 show the pipe 2 in the inserted position and the axially extending inwardly angled resilient retaining tabs 312 in the first locked position with the pipe retaining portions 314 engaging the external groove 4 and, in particular, the inner wall 5 of the groove 4 facing the pipe opening 210 (see FIG. 23). As also illustrated in FIGS. 22 and 23, the connection 110 preferably has a stop wall 15, as in the first embodiment, preferably formed integrally with the fitting body 10 and extending radially inward from the internal sidewall 212 of the pipe opening 201. However, the embodiment shown in FIGS. 21 to 31 has a single stop wall 15 with opposed surfaces facing the first and second ends 131, 132 of the fitting 10. The stop wall 15 limits axial insertion of the pipe 2 into the fitting body 10 and specifically the pipe opening 210. This prevents an insertion end 9 of the pipe 2 from being overly inserted into the fitting body 10. Furthermore, the pipe retaining portion 314 of the axially extending inwardly angled resilient retaining tabs 312 has an axial position $A_P$ (see FIG. 22) in the fitting body 10 with respect to the stop wall 15 which corresponds to an axial position $A_G$ (see FIG. 22) of the at least one external groove 4 with respect to the insertion end 9 of the pipe 2, such that the insertion end 9 of the pipe 2 is preferably near, but not adjacent to, the stop wall 15 when the pipe 2 is in the inserted position and the tabs 312 have moved to the first locked position with the pipe retaining portion 314 engaging the groove 4, as illustrated for instance, in FIGS. 22 and 23.

In a further preferred embodiment, and presuming a water tight seal is desired, a gasket 50 may be located between the insertion end 9 of the pipe 2 and the retaining ring assembly 300 when the pipe 2 is in the inserted position and the tabs 312 of retaining ring assembly 300 are in the first locked position, as illustrated for instance in FIG. 22. In this way, the gasket 50 may provide a fluid tight seal to the fitting body 10.

Furthermore, from a comparison of FIGS. 21, 22 and 23, showing the tabs 312 of the retaining ring assembly 300 in the first locked position, and FIGS. 26, 27, 28a and 28b, showing the tabs 312 of the retaining ring assembly 300 in the second unlocked position, it is apparent that relative axial movement of the tabs 312 of the retaining ring assembly 300 with respect to the fitting body 10 from the first locked position to the second unlocked position causes the pipe retaining portions 314 of each of the axially extending inwardly angled resilient retaining tabs 312 to disengage from the indentation 4 in the pipe 2, thereby permitting removal of the pipe 2 from the inserted position in the fitting body 10. In this way, each of the pipe retaining portions 314 of the axially extending inwardly angled resilient retaining tabs 312 are resiliently radially outwardly deformed to the second unlocked position, which has the effect of causing the pipe retaining portions 314 of each of the tabs 312 to disengage from the pipe 2. This is illustrated for instance in FIGS. 26, 27, 28a and 28b where the pipe retaining portions 314 have been radially outwardly moved from the groove 4. More particularly, when the tabs 312 are in the second unlocked position, the pipe retaining portions 314 no longer engage the pipe 2 and the pipe 2 may be removed from the inserted position of the fitting body 10. In this way, the connection 110 may be releasably connected to the pipe 2 permitting removal of the pipe 2 from the fitting 100.

Once the pipe 2 has been removed from the connection 110, both the connection 110 and the pipe 2 could be reused. In other words, the pipe 2 may be connected to the same connection 110, or a different connection 110 on another fitting (not shown). Furthermore, the same pipe 2 having indentations 4 could be releasably connected to connections 110 according to the first embodiment shown in FIGS. 1 to 11 or the second embodiment shown in FIGS. 12 to 31. In this way the pipe 2 with the indentation 4 is reversibly compatible with both embodiments. Likewise, the connection 110 on the second end 132 of the pipe coupling 101 could be reused with another pipe (not shown).

It is apparent that the relative axial movement of the tabs 312 with respect to the fitting body 10 from the first locked position to the second unlocked position results from insertion of the removal tool 280, and preferably a removal tool 280 having two parts, 280a and 280b, as illustrated in FIG. 18. However, it should be appreciated that this relative movement can occur in any number of ways. For instance, it can be done through physical means or even through electromagnetic means, for instance if the grip ring 310 is made from a ferromagnetic metallic strip 301. It is preferred, however, that removal tool 280 be used to move the tabs 312 from the first locked position to the second unlocked position releasing the pipe 2, as described above. Furthermore, the removal tool 280 may be required to pry the pipe retaining portions 314 from the first locked position in the indentation 4 to the second unlocked position, if necessary.

Figure 26:
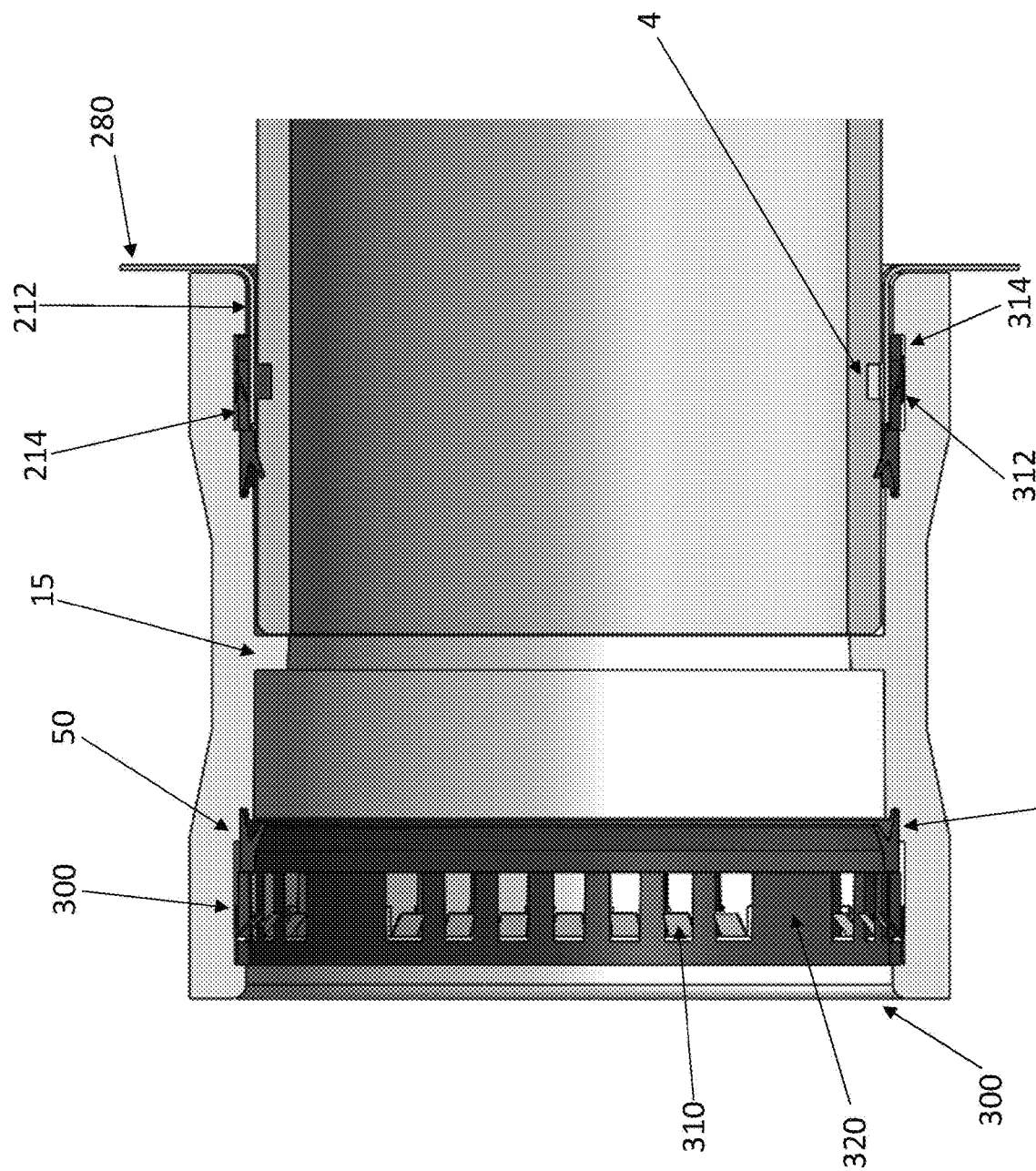
FIG. 26 is a cross-sectional view of the connect/disconnect fitting connection shown in FIG. 24 with the pipe in the inserted position and the pipe removal tool engaging the axially extending inwardly angled resilient retaining tabs of the retaining ring assembly to relatively move the axially extending inwardly angled resilient retaining tabs of the retaining ring assembly with respect to the fitting body from the first locked position to the second unlocked position permitting removal of the pipe.
Figure 27:
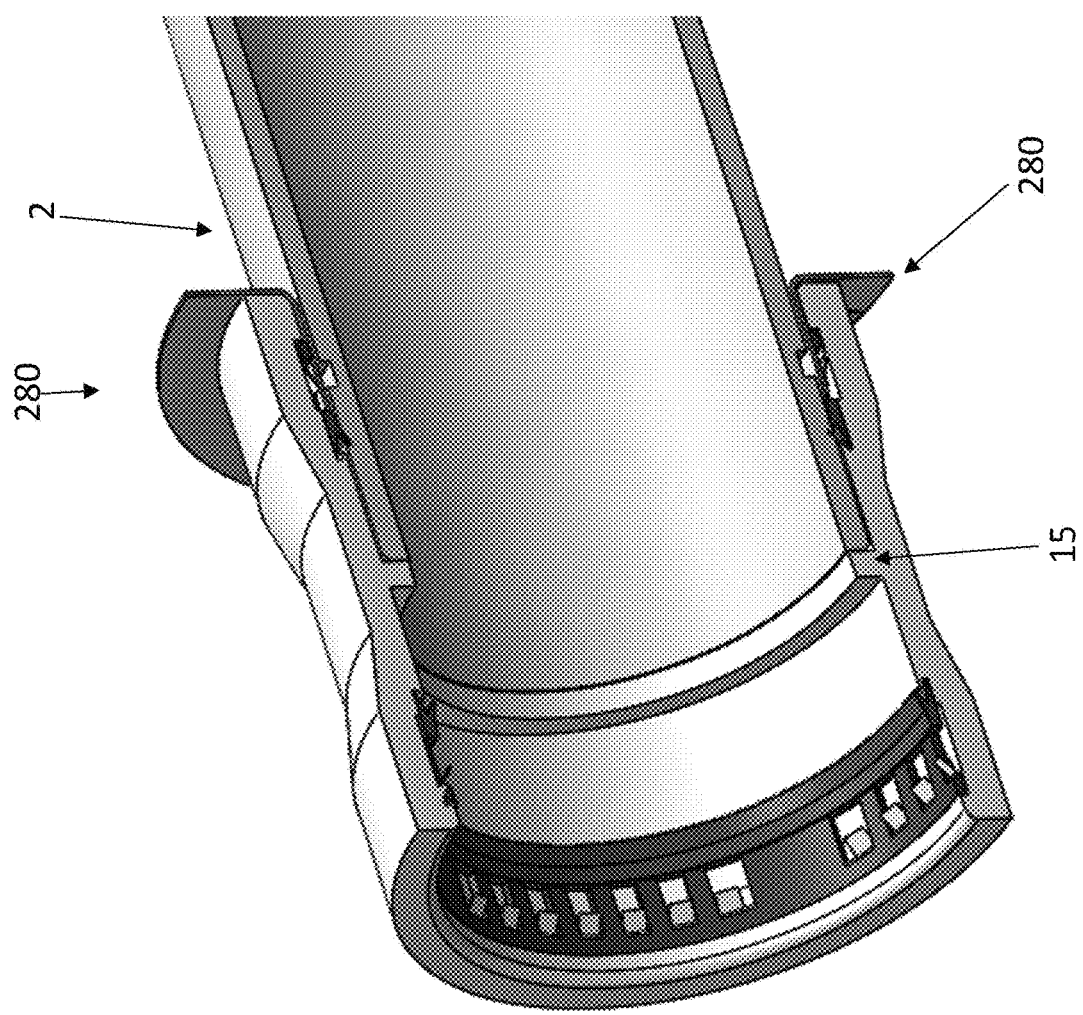
FIG. 27 is a cross-sectional view of the connect/disconnect fitting connection shown in FIG. 26 with the axially extending inwardly angled resilient retaining tabs of the retaining ring assembly in the second unlocked position permitting removal of the pipe.
Figure 28A:
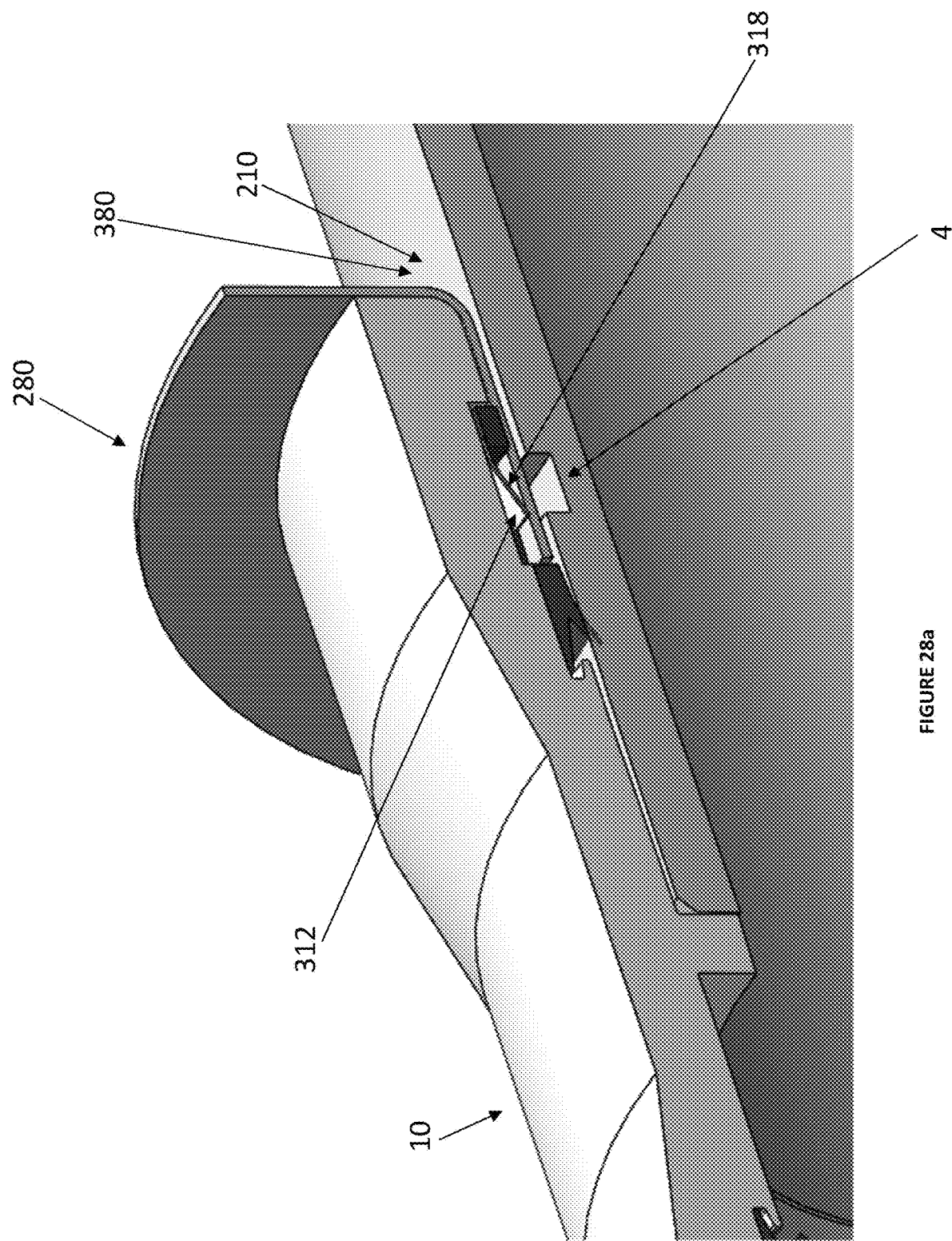
FIG. 28a is a detailed view of the connect/disconnect fitting connection shown in FIG. 27 with the removal tool having moved the axially extending inwardly angled resilient retaining tabs of the retaining ring assembly to the second unlocked position to permit removal of the pipe, and, FIG. 28b illustrates the pipe being removed from the pipe opening.
Figure 28B:
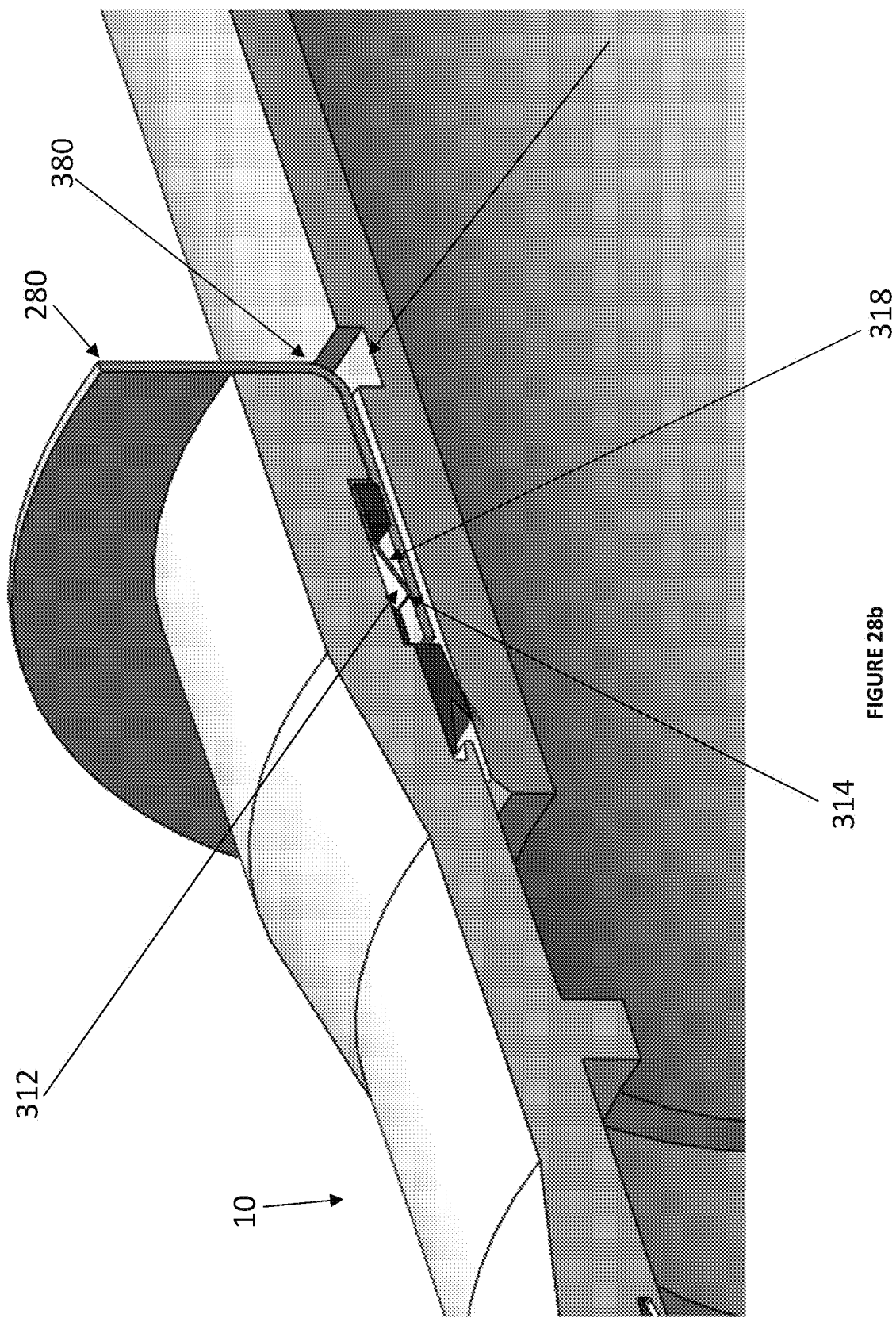

Accordingly, while the relative movement of the tabs 312 of the retaining ring assembly 300 with respect to the fitting body 10 from the first locked position to the second unlocked position may be performed in a number of ways, in a preferred embodiment, the connection 110 comprises a removal tool, shown generally by reference numeral 280 in FIGS. 25, 26, 27, 28a and 28b, to engage the axially extending inwardly angled resilient retaining tabs 312 facilitating relative movement thereof with respect to the fitting body 10 from the first locked position to the second unlocked position. The removal tool 280 of the second embodiment is similar to the removal tool 80 of the first embodiment except that the removal tool 280 of the present embodiment is designed to fit within the space 380 between the pipe 2 and the internal sidewall 212 of the pipe opening 210. The removal tool 280 of the second embodiment is shown in FIGS. 24 and 25 about to engage the tab 312 while the tab 312 is still in the first locked position. The removal tool 280 is shown in FIGS. 26, 27.28a and 28b engaging the tab 312 of the retaining ring assembly 300 while the tabs 312 are in the second unlocked position. In FIG. 28b, the pipe 2 is in the process of being removed and the external groove 4 has already exited the first opening 210 and the insertion end 9 of the pipe 2 is now distant from the stop wall 15.

As illustrated in FIG. 25, each of the tabs 312 of the retaining ring assembly 300 preferably comprises a removal tool engaging surface 318 which is also illustrated in FIG. 16. The removal tool engagement surface 318 is preferably oriented along the blade 313 facing the pipe opening 210. The removal tool 280 preferably also comprises a retaining tab engagement surface 282 which engages the removal tool engagement surface 318 of the tab 312 when the pipe 2 is in the inserted position to facilitate relative movement of the tab 312 with respect to the fitting body 10 and pipe 2. In particular, the retaining tab engagement surface 232 is intended to enter the space 380 of the pipe opening 210 and engage the removal tool engagement surface 318 of each of the tabs 312 with the pipe opening 210. In the preferred embodiment, as illustrated in FIG. 18, the removal tool 280 may consist of two separate parts 280a and 280b as discussed above. Preferably, the retaining ring assembly 300 is annularly shaped and substantially contained within the fitting body 10 when the pipe 2 is in the inserted position as shown in FIG. 25. The retaining ring assembly 300 preferably permits axial movement of the removal tool 280 between an outer surface of the pipe 2 and the inner sidewall 212 of the pipe opening 210 axially past the main body 304 of the retaining ring assembly 300 within the internal groove 214 so that the retaining tab engagement surface 280 may engage the removal tool engagement surface 318 of each of the tabs 314 angled radially inwardly from the main body 304 substantially contained within the internal groove 314. Depending on the type of connection 110, the removal tool 280 may need to pry the pipe retaining portions 314 out of the external groove 4 in the pipe 2 but, in any event, the pipe retaining portions 314 should disengage from the external groove 4 and, in particular, the inner wall 5 thereof. In this way, the tabs 312 are moved from the first locked position to the second unlocked position where the pipe retaining portions 314 of each of the axially extending inwardly angled resilient retaining tabs 312 are disengaged from the indentation on the pipe 2 thereby permitting removal of the pipe 2 from the inserted position in the fitting body 10.

More preferably, and is shown in FIG. 24, the pipe retaining portions 314 define a perimeter of an engagement circle 399 having an inner diameter $I_{PR}$ which is a smaller diameter than the outer diameter $O_{DP}$ of the pipe 2. However, the main body 304 of the retaining ring assembly 300 has an inner diameter $I_{RRP}$ which is greater than the outer diameter $O_{DA}$ of the pipe 2. In this embodiment, the main body 304 may be considered the retainer clip 320 and the portion of the grip ring 310 from which the tabs 312 radially inwardly extend. This radial space corresponds to the space 380 at the opening 210 and facilitates initial insertion of the pipe 2 as well as axial insertion of the removal tool 280 between the pipe 2 and the retaining ring assembly 300 to engage the removal tool engagement surface 318 of each of the tabs 312. In this way, the retaining ring assembly 300 is also concealed within the fitting body 10, which lessens the likelihood that the tabs 312 of the retaining ring assembly 300 would be moved unintentionally and/or undesirably from the first locked position to the second unlocked position, and/or, that the tabs 312 and assembly 300 are adversely affected, such as by the external environment.

Preferably, the removal tool 280, and in particular the retaining tab engagement surface 280, may be received within the pipe opening 210 and fit between the outer surface of the pipe 2 and the inner wall 212 of the pipe opening 210 of the fitting body 10 when the pipe 2 is in the inserted position, such as through the space 380, to engage the removal tool engaging surface 318 of the tabs 312 of the retaining ring assembly 300. In this way, axial movement of the removal tool 280 against the removal tool engaging surface 318 of each of the tabs 312 of the retaining ring assembly 300 permits axial movement of the tabs 312 of the retaining ring assembly 300 from the first locked position to the second unlocked position. In a preferred embodiment, the removal tool 280 may be composed of two parts 280a, 280b that fit against at least a portion, and preferably all, of the circumference CP of the pipe 2 such that the retaining tab engagement surface 280 extends around the perimeter or circumference CP of the pipe 2 through the two parts 280a and 280b to preferably substantially simultaneously engage the removal tool engagement surface 318 of each of the tabs 314. In this case, the retaining tab engagement surface 282 preferably also extends over the two parts 280a, 280b so as to extend around the circumference CP of the pipe 2 to engage all of the tabs 312.

As illustrated in FIG. 25, in a preferred embodiment, the removal tool engaging surface 282 fits within the pipe opening 210 between the pipe 2 in the inserted position and the main body 304 of the retaining ring assembly 300 to engage the removal tool engaging surfaces 318 on each of the tabs 312 of the retaining ring 300 located within the pipe opening 210 of the fitting body 10. In this way, the tabs 312 may be moved from the first locked position to the second unlocked position while protected within the opening 210 and it is less likely that the tabs 312 may be damaged and/or inadvertently removed from the first locked position to the second unlocked position.

A comparison of FIGS. 28a and 28b illustrate the removal of the of pipe 2 after the removal tool 280 has engaged the removal tool engagement surface 318 of the tabs 312 to relatively move them from the first locked position to the second unlocked position and the pipe retaining portions 314 have disengaged from the external groove 4 in the pipe 2. This permits the removal of the pipe 2 as shown in FIG. 28b from the fitting 100. The removal tool 280 can be removed from the pipe opening 210 once the groove 4 is seen exiting from the pipe opening 210 as shown in FIG. 28b so that it is clear the pipe retaining portions 314 of the tabs 312 would not reengage indentation 4.

The initial insertion of the pipe 2 into the second end 132 of the pipe coupling 101 prior to the connection 110 engaging and connecting to the pipe 2 is illustrated in FIGS. 29 to 31. As illustrated in these figures, the pipe 2 is axially inserted into the fitting body 10 through the pipe opening 210. As illustrated in the FIGS. 29 and 31, while the pipe 2 is inserted into the pipe opening 210, the pipe 2 engages the axially extending inwardly angled resilient retaining tabs 312 and resiliently radially outwardly deforms the tabs 312 permitting axial insertion of the pipe 2 into the pipe opening 210 of the fitting body 10. To facilitate axial insertion of the pipe 2, the pipe 2 preferably has a pipe chamfered edge, shown generally by reference numeral 3 in FIG. 31, at the insertion end 9 of the pipe 2. The pipe chamfered edge 3 preferably engages the axially extending inwardly angled resilient retaining tabs 312 of the retaining ring assembly 300 during the axial insertion of the pipe 2 to resiliently outwardly deform the resilient retaining tabs 312 permitting axial insertion of the pipe 2 to the inserted position.

As illustrated in FIG. 16, the tabs 312 preferably also comprise a pipe engagement portion 319 which is engaged by the pipe 2, and in particular the chamfered edge 3, when the pipe 2 is axially inserted into the pipe opening 210. This facilitates the resilient outward deformation of the tabs 312 permitting the axial insertion of the pipe 2 in to the inserted position. In a further preferred embodiment, the removal tool engagement surface 318 located on the axially extending inwardly angled resilient retaining tabs 312 substantially coincides with the pipe engagement portion 319. In this way, the same surfaces or portion of the tabs 312 which is used to engage the insertion end 9 of the pipe 2 and, in particular the chamfered edged 3 of the pipe 2, would also engage or interact with the retaining tab engagement surface 282 of the removal tool 280. In this way, the axially extending inwardly angled resilient retaining tabs 312 are effectively resiliently deformed radially outwardly from the retaining ring assembly 300 to permit first insertion of the pipe 2 into the inserted position, and then relative axial movement from the first locked position to the second unlocked position by operation of the removal tool 280.

As illustrated in FIG. 25, the inner diameter lea of an engagement circle 399 formed by the pipe retaining portions 314 when they are at rest is less than the outer diameter $O_{DP}$ of the pipe 2 and they are angled radially inwardly from the internal groove 214 on the inner wall 212 of the pipe opening 210. In this way, when the pipe 2 is inserted to the inserted position and the tabs 312 extend into the external groove 4 to the first locked position, this movement of the tabs 312 may occur suddenly and possibly emit a sound. This sudden resilient radially inward deformation of the tabs 312 therefore could create an audible snapping sound. This snapping sound could act as an audible indication that the pipe 2 has been inserted into the inserted position and, more importantly, that the tabs 312 have moved to the first locked position with the pipe retaining portions 314 having engaged the groove 4 to retain the pipe 2 in the inserted position. As also illustrated in FIG. 31, in a preferred embodiment, the groove 4 of the pipe 2 has at least the inner wall 5 as discussed above. The insertion of the pipe 2 into the pipe opening 210 to the inserted position causes the pipe retaining portions 314 of the tabs 312 to operatively engage the external groove 4 and, specifically, the inner wall 5 thereof, to retain the pipe 2 in the inserted position while the tabs 312 remain in the first locked position. This inserted position corresponds to the position shown in FIGS. 21 to 23 discussed above.

Accordingly, various preferred embodiments and features of the releasable connect/disconnect connection 110 have been described. It is understood that the connection fitting 110 of the present invention has been described with respect to a particular type of pipe fitting 100, namely a pipe coupling 101, but it is understood that the invention is not limited to pipe couplings 101. Rather, the present invention may be used with any type of pipe fitting 100. In particular, the connection 110 of the present invention could be used with elbow fittings, tee fittings, wye fittings, pipe reducing fittings and pipe expanding fittings, P traps, S traps, and end caps, to provide a few non-limiting examples. This fitting connection of the present invention is not limited to pipe fitting, but could also be used with flanges and other applications to replace solvent welded joints or connections.

It is understood that no element, act or implementation described in this description of the present application should be construed as essential to the invention or critical to the implementation, unless explicitly described as such. Also, where only one item is intended, the term "one" or similar language is used, but it is understood that the article "a" is intended to include one or more items. Furthermore, the word "comprising" is intended to mean including, unless explicitly stated otherwise.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A connection to connect and disconnect a pipe to a fitting, the connection comprising:
  a fitting body having a pipe opening for axially receiving a pipe along a longitudinal axis;
  a retaining ring assembly having a grip ring defining a plurality of axially extending inwardly angled resilient retaining tabs, each axially extending inwardly angled resilient retaining tab having a pipe retaining portion;
  wherein the retaining ring assembly further comprises a retainer clip having a grip ring engagement surface which mates with a retainer engagement surface of the grin ring to retain the grip ring, said retainer clip comprises a fitting body engagement portion for engaging an internal sidewall of the pipe opening;
  wherein said pipe retaining portions engage an indentation on the pipe when the pipe is in an inserted position in the pipe opening and the axially extending inwardly angled resilient retaining tabs have moved to a first locked position to retain the pipe in the inserted position;
  wherein relative movement of the axially extending inwardly angled resilient retaining tabs of the retaining ring assembly with respect to the fitting body from the first locked position to a second unlocked position causes the pipe retaining portions of each axially extending inwardly angled resilient retaining tab to disengage from the indentation on the pipe and to permit removal of the pipe from the inserted position in the fitting body.

2. The connection as defined in claim 1, wherein the retaining ring assembly is substantially contained within the fitting body and fixed to an inner sidewall of the pipe opening with said retaining ring assembly located within or flush with the pipe opening of the fitting body.

3. The connection as defined in claim 1, further comprising a removal tool to relatively move the axially extending inwardly angled resilient retaining tabs of the retaining ring assembly with respect to the pipe from the first locked position to the second unlocked position;
  wherein said removal tool engages the axially extending inwardly angled resilient retaining tabs of the retaining ring assembly to move them from the first locked position, engaged with the indentation on the pipe, to the second unlocked position, disengaged from the indentation on the pipe.

4. The connection as defined in claim 3, wherein the retaining ring assembly comprises an annularly shaped main body with the axially extending inwardly angled resilient retaining tabs extending from the main body, said retaining ring assembly is substantially contained within the fitting body;
  wherein said retaining ring assembly comprises removal tool engaging surfaces which are located on the axially extending inwardly angled resilient retaining tabs facing the pipe opening when the pipe in the inserted position and the retaining ring assembly is located within or flush with the pipe opening of the fitting body; and
  wherein said removal tool fits within the pipe opening between the pipe in the inserted position and the main body of the retainer ring assembly to engage the removal tool engaging surfaces on each of the axially extending inwardly angled resilient retaining tabs of the retaining ring assembly and move the axially extending inwardly angled resilient retaining tabs from the first locked position to the second unlocked position.

5. The connection as defined in claim 3 wherein the removal tool to relatively axially move the axially extending inwardly angled resilient retaining tabs of the retaining ring assembly with respect to the fitting body from the first locked position to the second unlocked position comprises a first part and a second part which together encompass an outer perimeter of the pipe;
  wherein substantially simultaneous relative axial movement of said first part and second part of the removal tool between the pipe and the retaining ring assembly from the pipe opening axially past the indentation on the pipe causes the removal tool to engage the axially extending inwardly angled resilient retaining tabs of the retaining ring assembly to move them from the first locked position to the second unlocked position permitting removal of the pipe from the inserted position in the pipe opening.

6. The connection as defined in claim 1 further comprising a gasket to seal the fitting, said gasket located axially between an insertion end of the pipe and the retaining ring assembly when the pipe is in the inserted position and the axially extending inwardly angled resilient tabs are in the first locked position.

7. The connection as defined in claim 1 wherein axial insertion of the pipe into the fitting opening of the fitting body causes the pipe to resiliently radially outwardly deform the axially extending inwardly angled resilient retaining tabs of the resilient retaining assembly permitting axial insertion of the pipe into the pipe opening of the fitting body; and
    wherein continued insertion of the pipe into the pipe opening to the inserted position causes the axially extending inwardly angled resilient retaining tabs of the retaining ring assembly to move to the first locked position engaging the indentation on the pipe to retain the pipe in the inserted position.

8. The connection as defined in claim 7, wherein the indentation on the pipe comprises at least one external groove on the pipe which operatively engages the pipe retaining portions of the axially extending inwardly angled resilient retaining tabs when the pipe is in the inserted position and the axially extending inwardly angled resilient retaining tabs are in the first locked position.

9. The connection as defined in claim 8, wherein the at least one external groove has an inner wall facing the pipe opening when the pipe is in the inserted position such that insertion of the pipe into the pipe opening to the inserted position causes the pipe retaining portions of the axially extending inwardly angled resilient retaining tabs to operatively engage the inner wall of the at least one external groove and retain the pipe in the inserted position while the axially extending inwardly angled resilient retaining tabs remain in the first locked position.

10. The connection as defined in claim 9, wherein the axially extending inwardly angled resilient retaining tabs are substantially identical and the corresponding pipe retaining portions define a perimeter of an engagement circle having an inner diameter which is less than the outer diameter of the pipe such that, when the axially extending inwardly angled resilient retaining tabs are resiliently inwardly deformed into the external groove, the pipe retaining portions engage the pipe to retain the pipe in the inserted position.

11. The connection as defined in claim 10 wherein each of the axially extending inwardly angled resilient retaining tabs have a pipe engaging portion facing the pipe opening of the fitting body which engages the pipe during axial insertion thereof to resiliently outwardly deform the axially extending inwardly angled resilient retaining tabs permitting axial insertion of the pipe to the inserted position in the fitting body.

12. The connection as defined in claim 11 wherein the removal tool engaging surfaces located on the axially extending inwardly angled resilient retaining tabs substantially coincide with the pipe engaging portions.

13. The connection as defined in claim 1 further comprising a stop wall extending inwardly from an internal sidewall of the pipe opening, said stop wall limiting axial insertion of the pipe into the fitting body; and
    wherein the pipe retaining surface of the axially extending inwardly angled resilient retaining tabs has an axial position in the fitting body with respect to the stop wall which corresponds an axial position of the at least one groove with respect to an insertion end of the pipe such that the insertion end of the pipe is near but not adjacent the stop wall when the pipe is in the inserted position.

14. The connection as defined in claim 13 wherein the retaining ring assembly is annularly shaped; and
    wherein the pipe opening comprises an internal groove sized for receiving the retainer ring assembly such that the retaining ring assembly is substantially contained within the pipe opening.

15. The connection as defined in claim 14 wherein the axially extending inwardly angled resilient retaining tabs extend from the retaining ring assembly radially inwardly from the internal groove of the pipe opening and axially forward toward the stop wall.

16. The connection as defined in claim 1 wherein the retaining ring assembly is sized to permit axial insertion of a removal tool between the pipe and a main body of the retaining ring assembly to engage the axially extending inwardly angled resilient retaining tabs in the locked position;
    wherein relative axial movement of the removal tool between the pipe and the main body of the retaining ring assembly from the pipe opening axially past the indentation on the pipe causes the removal tool to engage the axially extending inwardly angled resilient retaining tabs extending from the main body of the retaining ring assembly to move them from the first locked position to the second unlocked position permitting removal of the pipe from the inserted position in the pipe opening.

17. The connection as defined in claim 1 wherein the grip ring has a relative radially outward flexure to radially outwardly expand into an internal groove located on an internal sidewall of the pipe opening, said internal groove sized for receiving the grip ring such that the grip ring is substantially contained within the fitting body and located within the pipe opening.

18. The connection as defined in claim 1 wherein the grip ring is substantially metallic and is made from a strip of metal that has a plurality of perpendicular cuts along a lateral side to form a multitude of blades oriented longitudinally along the strip of metal and extending from the lateral side;
    wherein a subset of said multitude of blades having been angled toward a center of the grip ring to define the plurality of axially extending inwardly angled resilient retaining tabs of the retaining ring assembly.

19. The connection as defined in claim 18 wherein the strip of metal is resiliently coiled to be radially outwardly biased to produce the relative radially outward flexure of the grip ring so that the grip ring may radially expand into the internal groove located on the internal sidewall of the pipe opening with the grip ring substantially contained within the pipe opening and providing space for the axial movement of a removal tool between the grip ring and the pipe.

20. The connection as defined in claim 1 wherein the fitting body engagement portion of the retainer clip comprises a pipe groove engagement surface to engage an internal groove of the pipe opening located on an internal sidewall of the pipe opening, said internal groove sized for receiving the retainer ring assembly comprising the retainer clip and the grip ring such that the retainer ring assembly is substantially contained within the pipe opening and the plurality of axially extending inwardly angled resilient retaining tabs are angled radially inwardly from the internal groove with the pipe retaining portions directed axially forward into the pipe opening for engaging the indentation on the pipe when the pipe is in the inserted position.

21. The connection as defined in claim 1 wherein the fitting body engagement portion of the retainer clip comprises a pipe opening permanent bonding surface which mates with a corresponding retainer clip bonding surface on the internal sidewall of the pipe opening permitting a permanent bond to be formed between the fitting body and the retainer clip of the retaining ring assembly, such that the retainer ring assembly is substantially contained within or flush with the pipe opening and the plurality of axially extending inwardly angled resilient retaining tabs are angled radially inwardly from the internal sidewall with the pipe retaining portions directed axially forward into the pipe opening for engaging the indentation on the pipe when the pipe is in the inserted position.

\* \* \* \* \*